(12) United States Patent
Rapparini

(10) Patent No.: US 9,061,826 B2
(45) Date of Patent: Jun. 23, 2015

(54) CAPSULES FOR OBTAINING INFUSIONS SUCH AS ESPRESSO OR BEVERAGES FROM WATER-SOLUBLE PRODUCTS AND CORRESPONDING MACHINES USING SAME

(76) Inventor: Gino Rapparini, Bologna (IT)

( * ) Notice: Subject to any disclaimer, the term of this patent is extended or adjusted under 35 U.S.C. 154(b) by 140 days.

(21) Appl. No.: 13/320,703

(22) PCT Filed: Apr. 8, 2011

(86) PCT No.: PCT/IB2011/001343
§ 371 (c)(1),
(2), (4) Date: Jan. 4, 2012

(87) PCT Pub. No.: WO2011/124990
PCT Pub. Date: Oct. 13, 2011

(65) Prior Publication Data
US 2012/0100259 A1 Apr. 26, 2012

(30) Foreign Application Priority Data
Apr. 9, 2010 (IT) .............................. BO2010A0216

(51) Int. Cl.
*B65B 29/02* (2006.01)
*B65D 85/804* (2006.01)
*A47J 31/36* (2006.01)

(52) U.S. Cl.
CPC ......... *B65D 85/8043* (2013.01); *A47J 31/3695* (2013.01)

(58) Field of Classification Search
CPC ............. B65D 85/8043; B65D 85/804; B65D 85/8046; B65D 85/816; B65D 2203/06; B65D 29/02; A47J 31/36; A47J 31/407; A47J 31/0673; A47J 31/0668; A47J 31/40

USPC ......... 426/77, 78, 79, 80, 81, 82, 83, 84, 112, 426/115, 119, 120, 106, 392, 394, 418; 99/295, 323

See application file for complete search history.

(56) References Cited

U.S. PATENT DOCUMENTS 4,853,234 A * 8/1989 Bentley et al. .................. 426/77
2002/0129712 A1 9/2002 Westbrook et al. ............. 99/279

(Continued)

FOREIGN PATENT DOCUMENTS

| IT | WO 2008/132571 A1 * | 11/2008 | ........... B65D 85/804 |
| WO | WO 2006/137737 | 12/2006 | |
| WO | WO 2009/008723 | 1/2009 | |

*Primary Examiner* — Rena L Dye
*Assistant Examiner* — Chaim Smith
(74) *Attorney, Agent, or Firm* — Fattibene and Fattibene LLC; Paul A. Fattibene

(57) ABSTRACT

The present invention relates to a capsule (1) for obtaining infusions, such as espresso, or beverages from water-soluble products, comprising an internal out flow duct (3) and being adapted to be hermetically sealed by means of a sealing element (10), wherein, by injecting water under pressure into the capsule (1), the sealing element (10) is lifted becoming detached from the top (7) of the internal out flow duct, opening the internal through hole (4) of the internal out flow duct (3) so that the infusion or beverage flows outwards through the internal through hole (4). Moreover, the present invention relates to a machine (17) for using capsules (1) according to the present invention and comprising housing means for housing at least one capsule during the dispensing phase and injection means (11) for injecting water under pressure into the capsule through the sidewall (2) of the capsule so as to obtain an infusion or beverage flowing out from the capsule through the internal through hole of the capsule.

20 Claims, 23 Drawing Sheets

(56) References Cited

U.S. PATENT DOCUMENTS

| | | | |
|---|---|---|---|
| 2003/0005826 A1 | 1/2003 | Sargent et al. | 99/279 |
| 2009/0223375 A1* | 9/2009 | Verbeek | 99/287 |
| 2010/0047418 A1 | 2/2010 | Bongers et al. | 426/431 |
| 2010/0068361 A1 | 3/2010 | Bongers et al. | 426/431 |
| 2011/0045144 A1 | 2/2011 | Boussemart et al. | 426/80 |

* cited by examiner

CAPSULES FOR OBTAINING INFUSIONS SUCH AS ESPRESSO OR BEVERAGES FROM WATER-SOLUBLE PRODUCTS AND CORRESPONDING MACHINES USING SAME

TECHNICAL FIELD

The present invention relates to the technical field of injection moulded or thermoformed capsules, hermetically sealed and filled with infusion products, such as espresso coffee, and/or with water-soluble products, such as powdered milk or cocoa, and of the corresponding machines using same.

PRIOR ART

Some kinds of injection moulded capsules comprising an internal out flow duct and filled with infusion products, such as espresso, or with water-soluble products, are known in the art. Some of the known capsules are cumbersome, expensive and difficult to produce because they are complex and very detailed which slows down their production. Other kinds of known capsules are not hermetically sealed. Consequently, the quality of the product contained in the capsules deteriorates in the course of time. Furthermore, the product can accidentally come out of the capsule, thus lowering the quantity of product contained in the capsule and contaminating the environment wherein the capsule is handled and/or stored.

Examples of capsules with internal out flow duct exhibiting the problems mentioned above can be found in WO 2009/008723 A1, WO 2008/078988 A1 and WO 2008/078991 A1.

The problem to be solved is thus the realization of an injection moulded or thermoformed capsule, hermetic and not cumbersome, which can be easily produced, thus reducing the costs, and which gives a high quality beverage both with infusion products and with water-soluble products. All the problems concerning the dimensions and the costs mentioned above are solved by the present invention.

Moreover, the proposed solution guarantees a high quality product because, being adapted to be hermetically sealed, it allows the conservation over the course of time of the organoleptic properties of the contained product, and it allows the flow of water, once it has become espresso or beverage, toward the cup only after a pre-infusion time under controlled pressure.

SUMMARY

The present invention is based on the idea of providing a capsule wherein, injecting water under pressure inside the capsule, the sealing element of the capsule lifts, opening an internal through hole so that the beverage flows out through the internal through hole.

According to an embodiment of the present invention, a capsule, injection moulded or thermoformed for obtaining infusions such as espresso or beverages from water-soluble products is provided, comprising an internal out flow duct and being adapted to be hermetically sealed by means of a sealing element, wherein, by injecting water under pressure into the capsule, the sealing element is lifted becoming detached from the top of the internal out flow duct, opening the internal through hole of the internal out flow duct so that the infusion or beverage flows outwards through the internal through hole. This capsule can be produced in an easy and inexpensive manner. Moreover, this capsule guarantees high quality beverages.

According to a further embodiment of the present invention, a capsule is provided, wherein the sealing element comprises a peeling barrier film sealing membrane. The membrane can be easily warped by the water under pressure injected inside the capsule so as to allow the beverage to infuse for a certain period of time inside the capsule before flowing out through the internal through hole, thus improving the quality of the beverage.

According to a further embodiment of the present invention, a capsule is provided, wherein the internal out flow duct is substantially perpendicular to the bottom of the capsule. This kind of duct can be realized in an easy manner. Furthermore, in this way, the beverage can flow easily out through the internal out flow duct.

According to a further embodiment of the present invention, a capsule is provided, wherein the top of the internal out flow duct is flat. This eases the adhesion of the sealing element to the top of the internal out flow duct. The good adhesion of the sealing element to the top of the internal out flow duct improves the functionality of the capsule thus allowing the sealing element to lift in a uniform manner with respect to the entire top of the internal out flow duct. Furthermore, in this way, an optimal sealing of the capsule is guaranteed and the accidental out flow of product through the internal out flow duct during the transport and storing phases of the capsule is prevented.

According to a further embodiment of the present invention, a capsule is provided, wherein the top of the internal out flow duct is substantially on the same level as the upper surface of the capsule. In this way the welding of the sealing element to both the edge of the capsule and the top of the internal out flow duct is eased and accelerated. Furthermore, the sealing element is thus substantially placed on a horizontal plane thus facilitating handling and storing operations of the capsule whereby the probability of breaking the sealing element is reduced. According to alternative embodiments of the present invention, the top of the internal out flow duct may be placed on an upper level with respect to the upper plane of the capsule so as to protrude. According to alternative embodiments, the top of the internal out flow duct may be placed on a lower level with respect to the upper plane of the capsule so as to ease the outflow of the beverage through the internal through hole.

According to a further embodiment of the present invention, a capsule is provided wherein the internal out flow duct has substantially a conical shape. This shape can be realized in a particularly easy and quick way. Furthermore, this shape eases the outflow of the beverage.

According to a further embodiment of the present invention, a capsule is provided, wherein the internal out flow duct ends with a cylindrical portion in correspondence to the top of the internal out flow duct.

According to a further embodiment of the present invention, a capsule is provided, wherein the internal out flow duct comprises a terminal protruding portion, protruding with respect to the adjacent portion of the external outer surface of the bottom of the capsule so as to hinder the flow along the external surface of the bottom of the capsule of the infusion or beverage flowing through the internal through hole. Thanks to the terminal protruding portion, the infusion or beverage flowing through the internal through hole is efficiently expelled from the capsule. In particular, the protruding portion hinders the flow of the infusion or beverage along the external surface of the bottom of the capsule. In this way, the beverage is not wasted along the bottom of the capsule, the entire produced beverage is efficiently collected, and the probability of dirtying both the capsule and, possibly, the housing of the capsule in the dispensing machine using the capsule, is reduced.

According to a further embodiment of the present invention, a capsule is provided, further comprising a lower filtering element applied in proximity to the bottom of the capsule so as to form a room for entry of the water under pressure into the capsule. The water entering into the capsule is thus initially in a room where the product is not present. Since the water does not encounter resistance, it can easily spread out in the entire volume of the entry room, and thus subsequently hit in an efficient way the entire product contained in the capsule. In particular, since the entry room for the entry of water under pressure inside the capsule is formed by a filtering element, the water under pressure flows through the filtering element and reaches the space of the capsule where the product is contained, after having occupied the entire volume of the entry room. The presence of the room for the entry of the water eases the entry of water into the capsule thus reducing the probability that the product contained in the capsule is not effectively hit by the water. In this way, wastage of the product is avoided, and the quality of the beverage produced is improved. In particular, in the case where the product contained in the capsule is not homogeneously compact, the water could flow up through preferential ways created in the areas having lower compact grade, thereby not hitting the entire product, obtaining only partial infusion, and thus lowering the quality of the beverage. Furthermore, the presence of the room for the entry of water where the product is not contained, allows reducing the probability that the injection means for injecting water of the machine for using the capsule might become damaged, for example by being blocked or unduly worn by the product. In particular, the water injection means are thus inserted in a room where the product is not present and thus do not come into direct contact with the product itself.

According to a further embodiment of the present invention, a capsule is provided, wherein the lower filtering element has a larger diameter than the diameter of the capsule so as to comprise an outer edge adapted to be folded so as to adhere to a portion of the inner surface of the sidewall of the capsule. The filtering element can thus be welded to the capsule by means of the outer edge, increasing the rigidity of the filtering element and the stability of the capsule.

According to a further embodiment of the present invention, a capsule is provided, further comprising an upper filtering element applied between the top of the internal out flow duct and the sealing element so that the infusion or beverage flows through the upper filtering element before lifting the sealing element and flows through it again before flowing out through the internal through hole. By means of this solution, a filter that allows filtering the beverage twice before flowing out of the capsule is realized in an easy and inexpensive way, noticeably improving the quality of the beverage. This solution is particularly advantageous for beverages obtained from infusion products.

According to a further embodiment of the present invention, a capsule is provided wherein the upper filtering element is welded to the upper surface of the capsule and to the top of the internal out flow duct, and the sealing element is welded to the upper surface of the capsule and to the top of the internal out flow duct through the upper filtering element so that the lower surface of the sealing element adheres to the upper surface of the upper filtering element.

According to a further embodiment of the present invention, a capsule is provided wherein at least one or both of the lower filtering element and the upper filtering element comprise permeable and filtering thermosealable material. The thermosealable material can be applied to the body of the capsule in an easy, inexpensive and quick way. According to particular embodiments of the present invention, the permeable and filtering thermosealable material comprises thermosealable filtering paper. The thermosealable filtering paper is advantageous because it is inexpensive.

According to a further embodiment of the present invention, a capsule is provided wherein the internal out flow duct comprises an enlarged terminal portion in proximity to the bottom of the capsule so as to form a protrusion inside the capsule. The protrusion can be for example adapted to support the lower filtering element. In this way, the lower filtering element can be applied in an efficient way in proximity to the bottom of the capsule. For example, the lower filtering element can be welded to the protrusion.

According to a further embodiment of the present invention, a capsule is provided wherein, for infusion products, a filtering wheel is provided, inserted in correspondence to the top of the internal out flow duct and sitting on the circular groove of the capsule. In this way, the beverage is filtered before lifting the sealing element of the capsule increasing the quality of the beverage obtained by means of the capsule.

According to a further embodiment of the present invention, a capsule is provided wherein the internal through hole comprises a plurality of filtering holes in proximity to the top of the internal out flow duct. In this way, the beverage is filtered before flowing out of the capsule thus increasing the quality of the beverage obtained by means of the capsule.

According to a further embodiment of the present invention, a capsule is provided wherein the capsule is hermetically sealed by the sealing element which is welded to the upper surface of the capsule and to the top of the internal out flow duct by means of a differential detachment welding. The hermetical sealing allows the organoleptic properties of the product contained in the capsule to be kept intact for a long period of time. Furthermore, the probability that the product contained in the capsule accidentally exits from the capsule itself, for example during the transport and handling phases of the capsule, is noticeably reduced. The differential detachment welding allows for easy lifting of the sealing element from the top of the internal out flow duct so as to open the through hole and keeping, at the same time, the sealing element fixed in a stable way to the upper edge of the capsule.

According to a further embodiment of the present invention, a capsule is provided further comprising a flat surface, having a lower thickness than the thickness of the sidewall of the capsule, on the external sidewall of the capsule. The flat surface having a lower thickness than the sidewall of the capsule eases the penetration of the injection means for injecting water under pressure into the capsule.

According to a further embodiment of the present invention, a capsule is provided wherein the bottom of the capsule comprises a strengthening structure adapted to keep the bottom substantially flat. In some cases, the bottom of the capsule could bend toward the inside of the capsule. The presence of the strengthening structure reduces the probability for this to happen and stabilizes at the same time the bottom of the capsule. An example of strengthening structure can be given by a couple of concentric and intertwined Archimedean spirals. This solution, besides providing an efficient strengthening for the bottom of the capsule, has a particular aesthetical quality. In order to further strengthen the bottom of the capsule, the two Archimedean spirals can be connected to each other by means of ribs.

According to a further embodiment of the present invention, a machine for using capsules according to the present invention is provided, comprising housing means for housing at least one capsule during the dispensing phase and injection means for injecting water under pressure into the capsule through the sidewall of the capsule so as to obtain an infusion or beverage flowing out from the capsule through the internal through hole of the capsule. The beverages or infusions obtained by means of this machine have a particularly high quality.

According to a further embodiment of the present invention, a machine is provided, wherein the injection means are adapted to create a vortex of water under pressure inside the capsule, so that the vortex involves the entire product contained, lifts the sealing element and, after a pre-infusion time, detaches it from the top of the internal out flow duct opening the hole through which the infusion or beverage flows out, even if dense and full-bodied. The product contained in the capsule is thus effectively hit by the water avoiding waste and improving the quality of the beverages obtained.

According to a further embodiment of the present invention, a machine is provided, wherein the injection means are adapted to form a deformation toward the inside of the capsule on the sidewall of the capsule so as to improve the sealing between the injection means and the sidewall of the capsule. The deformation, or divarication, improves the seal between the injection means and the entry hole of the injection means in the sidewall of the capsule. Thanks to the pressure inside the capsule due to the water injected by means of the injection means, the surface of the sidewall of the capsule in correspondence with the deformation pushes against the injection means, enveloping them and improving the seal.

According to a further embodiment of the present invention, a machine is provided, wherein the injection means comprise a needle adapted to move in a direction perpendicular to the axis of the capsule and to penetrate through any point of the sidewall of the capsule in proximity to the bottom of the capsule, preferably through a flat surface whose thickness is lower than that of the sidewall of the capsule. The needle effectively penetrates any point on the sidewall of the capsule so that the orientation of the capsule inside the machine is not relevant for effectively introducing water under pressure into the capsule. Furthermore, the needle penetrates into the sidewall of the capsule and can form in the wall itself not only an entry hole, but also a deformation, or a divarication, of the sidewall of the capsule toward the inside of the capsule. This deformation improves the seal between the needle and the entry hole of the needle inside the capsule. In particular, thanks to the pressure inside the capsule due to the water injected by means of the needle, the surface of the sidewall of the capsule in correspondence with the deformation pushes against the needle enveloping it and improving the seal. The deformation of the sidewall and the seal can be further improved where the needle has a conical shape.

According to a further embodiment of the present invention, a machine is provided, wherein the inner bore of the needle is bent so that the water under pressure flowing out therefrom creates a circular vortex from bottom to top inside the capsule involving the entire product contained in the capsule. The bore inside the needle can exhibit different bending angles. For example, the curvature could be a 90° curvature, i.e. a right angle. Alternatively, the curvature might be so that the bending angle formed is greater than 90°.

According to a further embodiment of the present invention, a machine is provided, wherein the injection means further comprise sealing means adapted to hermetically seal the surrounding of the hole formed in the sidewall of the capsule for injecting water under pressure inside the capsule. In this way it is guaranteed that the water under pressure flowing out of the injection means does not exit from the hole formed on the sidewall of the capsule by the injection means.

According to a further embodiment of the present invention, a machine is provided, wherein the sealing means comprise a vertical plane adapted to hermetically seal the area surrounding the hole formed in the sidewall of the capsule for injecting water under pressure inside the capsule. In this way, the seal is realized in a simple, effective and easily realizable manner.

According to a further embodiment of the present invention, a machine is provided, further comprising enclosing means for mechanically enclosing the capsule inside the dispensing machine during the dispensing process. In this way, a closed housing for enclosing the capsule during the dispensing process is realized. According to an embodiment of the present invention, this housing can be cleaned in an effective and efficient way. For example, it could be necessary to clean the housing after a predetermined number of erogations, or when capsules containing different products are used in sequence, so that the beverages produced have an authentic taste. After the erogation of coffee, for example, it is appropriate to clean the housing of the capsule before dispensing, for instance, tea. The housing can be easily cleaned inserting a disc having substantially the same shape and dimensions as the sealing element of the capsule. At this point, without inserting any capsule into the housing, the injection means are operated so as to eject water under pressure. The water jet so obtained is not inserted into a capsule but spilled into the housing of the dispensing machine so as to effectively clean it. The disc having shape and dimensions substantially identical to those of the sealing element easily drives the jet of water inside the housing.

According to a further embodiment of the present invention, a machine is provided, wherein the enclosing means comprise a cover that, when closed, applies a mechanical pressure on the peripheral edge of the sealing element against the upper surface of the capsule, to prevent the sealing element from detaching from the edge of the capsule in the dispensing phase, when the pressure inside the capsule is maximum. The cover allows effectively keeping the edge of the sealing element attached to the capsule while the portion of the sealing element in correspondence to the internal through hole of the out flow duct lifts from the hole, freeing it and allowing the beverage to flow out.

According to a further embodiment of the present invention, a machine is provided, wherein the enclosing means further comprise adjusting means adapted to adjust the inner pressure of the capsule when the capsule is housed inside the machine during the dispensing phase. In this way, it is possible to precisely adjust the time the water stays under pressure inside the capsule, and thus, where infusion products are used, to adjust the concentration and taste of the produced beverages. If, for example, a low pressure is set inside the capsule, the water remains inside the capsule for a short time and the beverage will have a mild taste. Increasing the inner pressure that can be reached inside the capsule means that the water will remain inside the capsule for a longer time, thus increasing the infusion time and accentuating the taste of the beverage. In this way, acting on the adjusting means, it is possible to satisfy the tastes of several users without changing the structural properties of the capsule and without varying the quality and/or the quantity of product contained in the capsule. In other words, starting from identical capsules filled with the same amount of the same product, it is possible to obtain beverages of more or less intensity, thus satisfying different user tastes.

According to a further embodiment of the present invention, a machine is provided, wherein the adjusting means are placed so as to be in correspondence with the top of the internal out flow duct of the capsule when the capsule is housed inside the machine during the dispensing phase. The adjusting means act accordingly on the portion of the sealing element of the capsule fixed to the top of the out flow duct adjusting the inner pressure necessary to lift the sealing element from the top of the out flow duct.

According to a further embodiment of the present invention, a machine is provided, wherein the adjusting means adapted to adjust the inner pressure of the capsule comprise a sliding pin coupled to a spring whose pressure is adjustable by means of a threaded knob. This solution allows the easy realization of the means for adjusting the inner pressure of the capsule.

BRIEF DESCRIPTION OF THE FIGURES

The present invention is described with reference to the enclosed figures wherein the same reference numbers refer to the same parts and/or to similar parts and/or to corresponding parts of the system. In the figures.

DETAILED DESCRIPTION

In the following, the present invention is described with reference to particular embodiments as shown in the enclosed figures. Nevertheless, the present invention is not limited to the particular embodiments described in the following detailed description and shown in the figures, but rather the embodiments described simply exemplify several aspects of the present invention, the scope of which is defined by the claims.

Further modifications and variations of the present invention will be clear for the person skilled in the art. The present description is thus to be considered as including all said modifications and/or variations of the present invention, the scope of which is defined by the claims.

Figure 1:
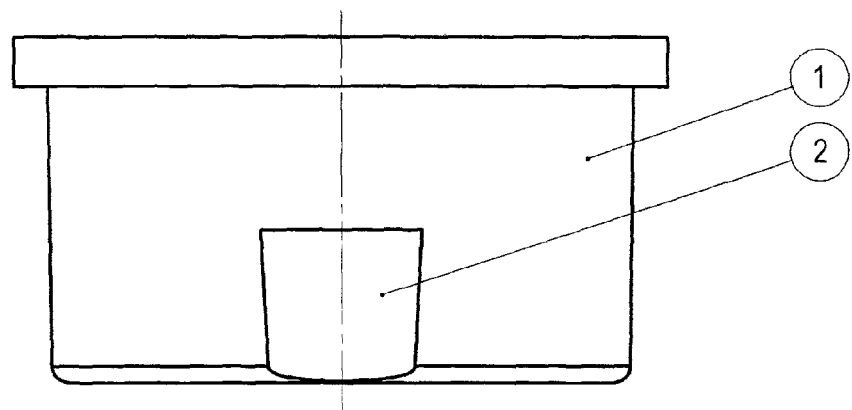
FIG. 1 schematically shows an external view of a capsule according to an embodiment of the present invention.

FIG. 1 shows an external view of the capsule 1 according to an embodiment of the present invention. It is possible to notice the presence of a flat surface 2 occupying a portion of the outer sidewall of the capsule.

Figure 2A:
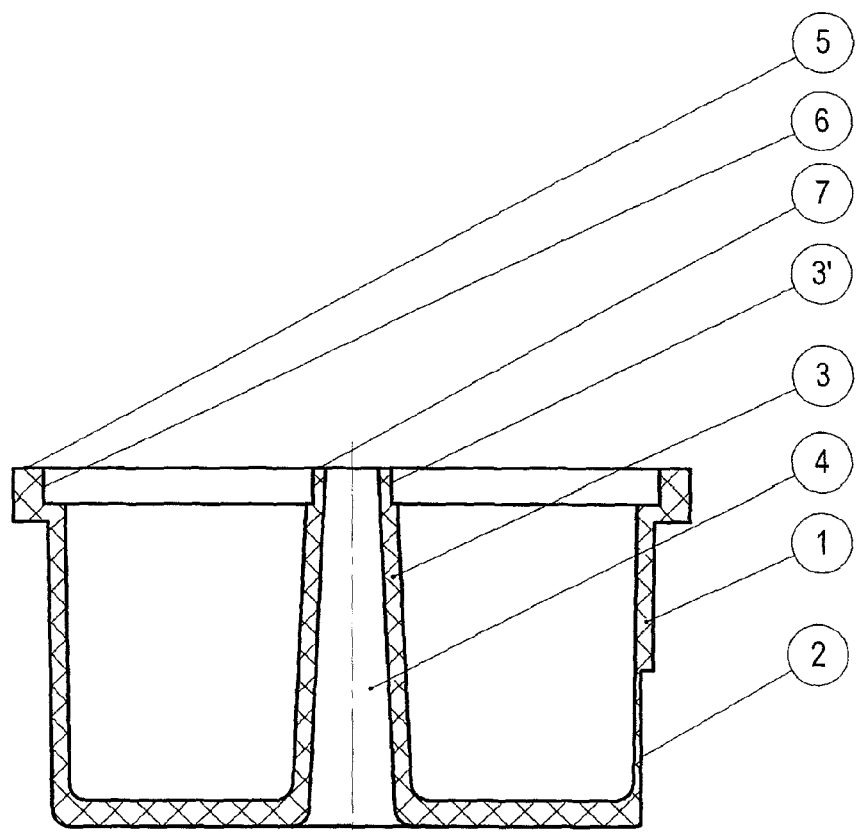
FIG. 2A schematically shows a vertical section view of a capsule according to an embodiment of the present invention.

FIG. 2A schematically shows an axial section of the structure of the capsule, substantially cylindrical, obtained by injection molding of thermoplastic material, of biodegradable material or by thermoforming. An internal out flow duct 3 having substantially a conical shape and ending in the cylindrical portion 3' is present at the centre of the capsule 1. The out flow duct 3 comprises an internal through hole 4, and its flat top 7 is substantially on the same level as the upper surface 5 of the capsule 1. The upper surface 5 has an annulus shape. Furthermore, the upper surface 5 exhibits a circular groove 6 in its internal portion. A flat surface 2 having a lower thickness than the thickness of the sidewall of the capsule is present on the outer side of the capsule. The internal out flow duct 3 is vertical, namely substantially perpendicular to the bottom of the capsule 1.

The capsule 1 has substantially a cylindrical shape, and the out flow duct is positioned in correspondence with the axis of symmetry corresponding to the height of the cylinder. The capsule 1 may have for instance any axial symmetry shape, and the out flow duct may be advantageously placed in correspondence with the axis of symmetry of the system.

Figure 2B:
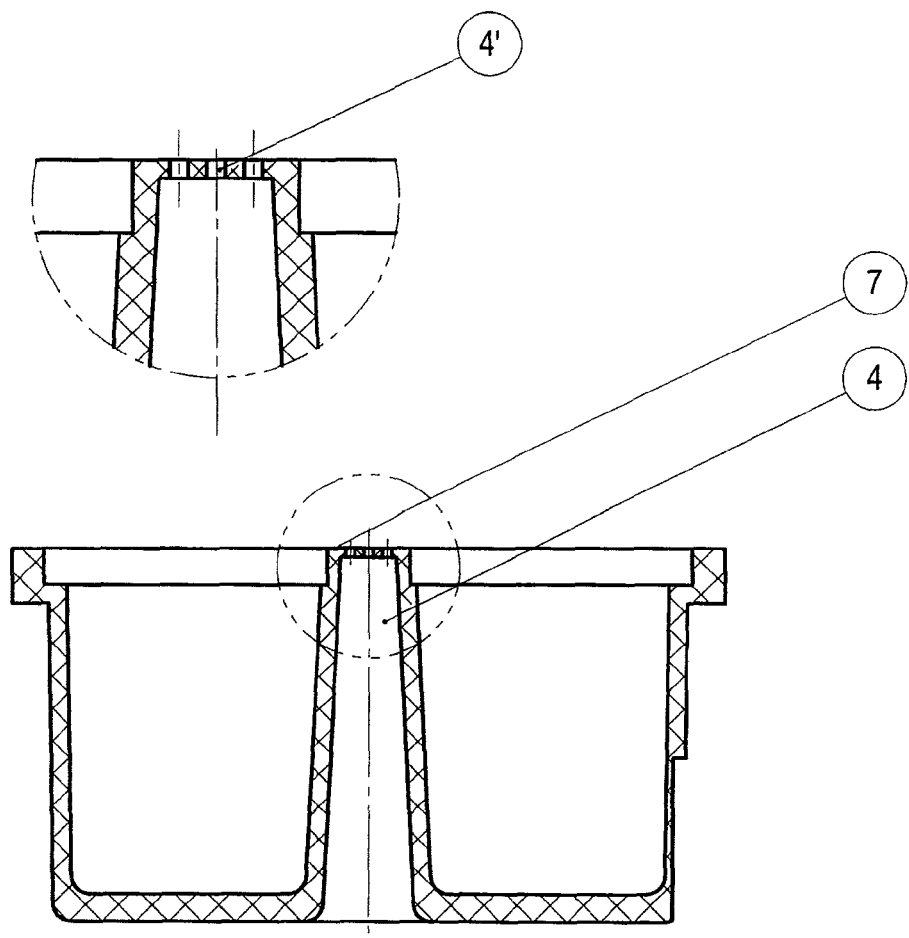
FIG. 2B schematically shows a vertical section view of a capsule according to a further embodiment of the present invention; an enlargement of a portion of the capsule is also shown.

FIG. 2B shows an alternative embodiment of the capsule wherein the through hole 4 at the top 7 of the out flow duct is provided with a plurality of small filtering holes 4'. The holes 4' allow filtering the beverage before it flows out through the through hole 4 and the internal out flow duct 3.

Figure 3:
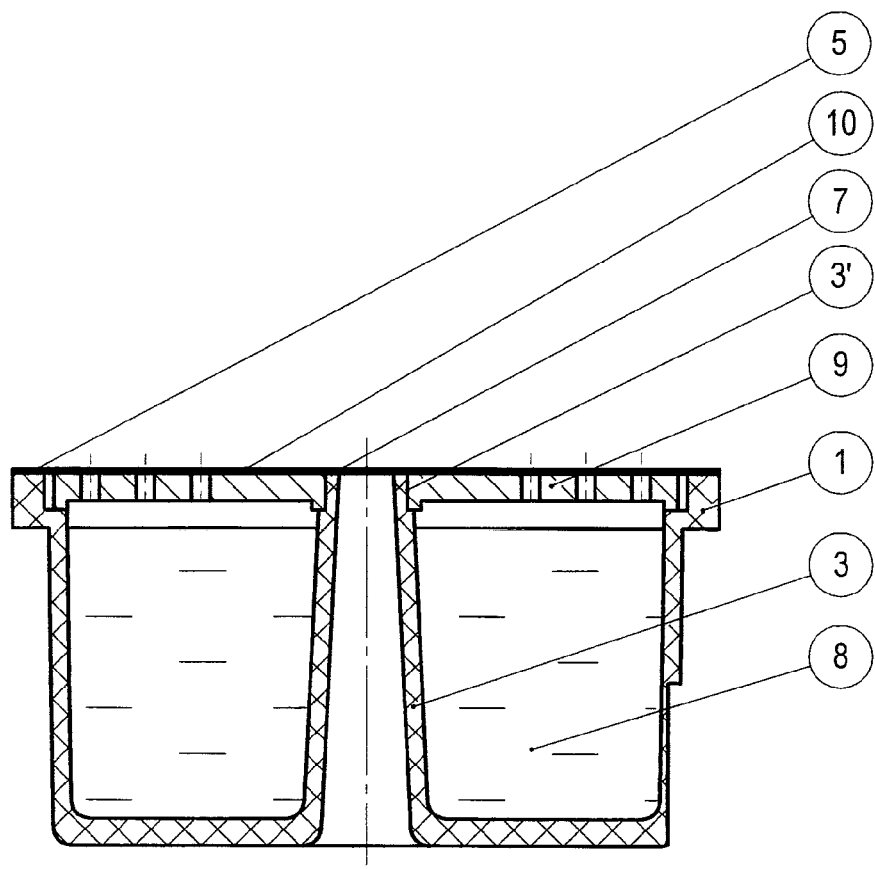
FIG. 3 schematically shows a vertical section view of a capsule according to a further embodiment of the present invention.

FIG. 3 displays an axial section of the capsule 1 according to a further embodiment of the invention. The capsule is filled with an infusion product 8, for example ground coffee, and a filtering wheel 9 with a central hole is centred and fit to the cylindrical portion 3' of the internal out flow duct 3 in correspondence with the top 7 of the out flow duct 3. The capsule is hermetically sealed by a sealing element 10, for example a peeling barrier film sealing membrane, welded to the upper surface 5 of the capsule and to the top 7 of the internal out flow duct 3. The sealing element 10 adheres to the upper surface of the filtering wheel 9.

Figure 4A:
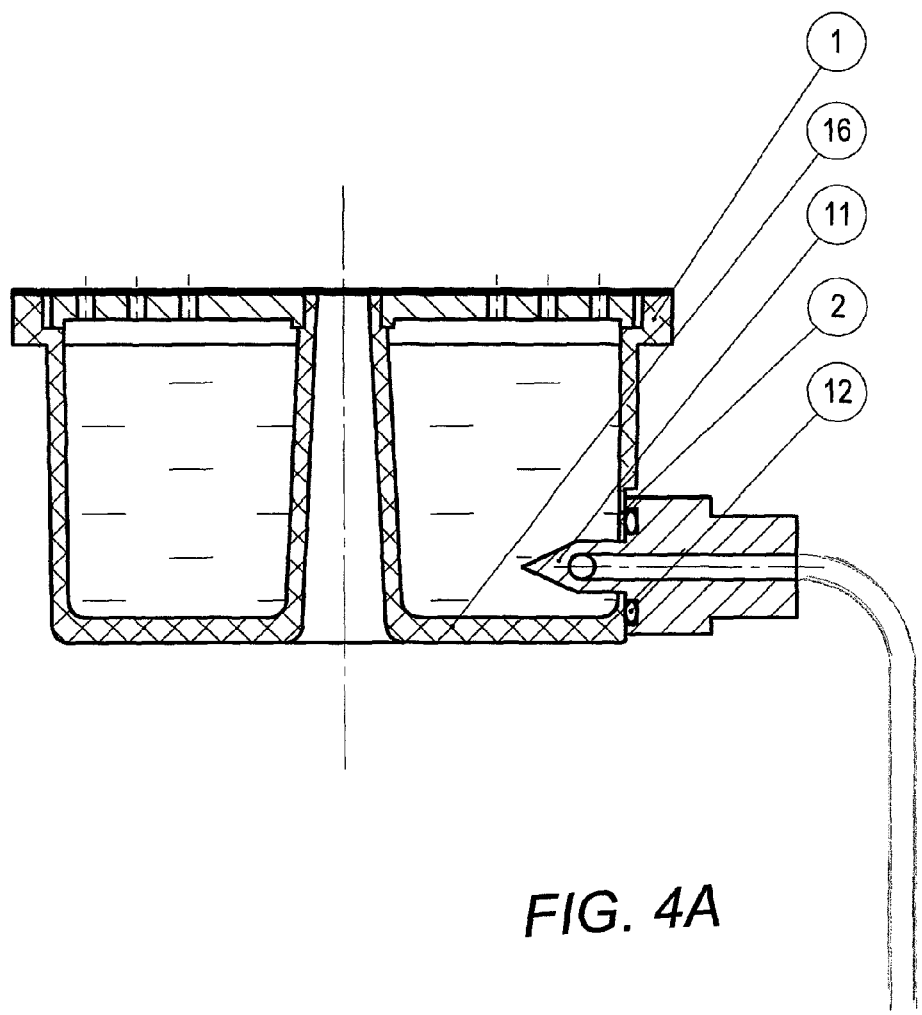
FIG. 4A schematically shows a vertical section view of the capsule shown in FIG. 3, inside which the injection means of the machine for using capsules according to an embodiment of the present invention are present.

FIG. 4A shows an axial section of the capsule 1 of FIG. 3 inside which injections means of the machine for using capsules according to an embodiment of the present invention are present. The injection means comprise a needle 11 which is penetrated laterally into the capsule in proximity to the bottom 16 of the capsule through the flat surface 2, and a vertical plane 12 carrying the needle 11 and being hermetically sealed against the corresponding flat surface 2.

Figure 4B:
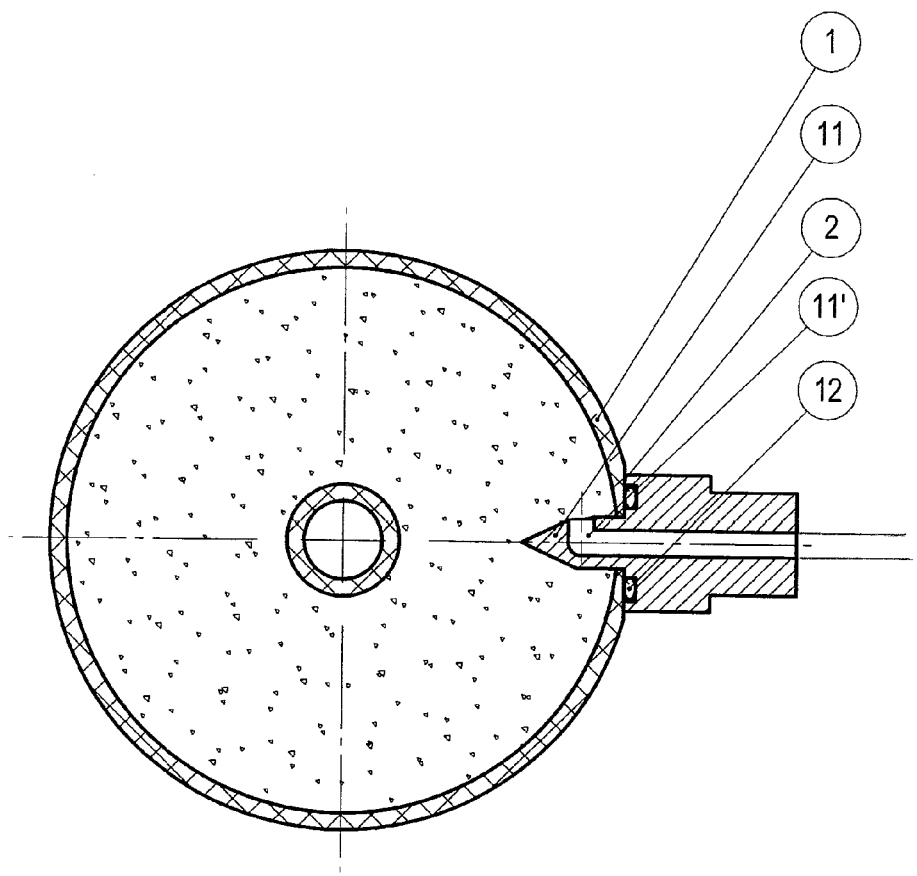
FIG. 4B schematically shows a horizontal section view of the system shown in FIG. 4A.

FIG. 4B shows a horizontal cross-section of the system shown in FIG. 4. The terminal portion of the inner bore 11' of the needle 11 is bent. In this way, the inner bore 11' of the needle 11 exits laterally with respect to the terminal pointed portion of the needle 11. In the example shown in FIG. 4B, the bending curvature of the inner bore of the needle is so as to form an angle substantially of 90°. Alternatively, the curvature could be so as to form angles greater than 90°.

Figure 5:
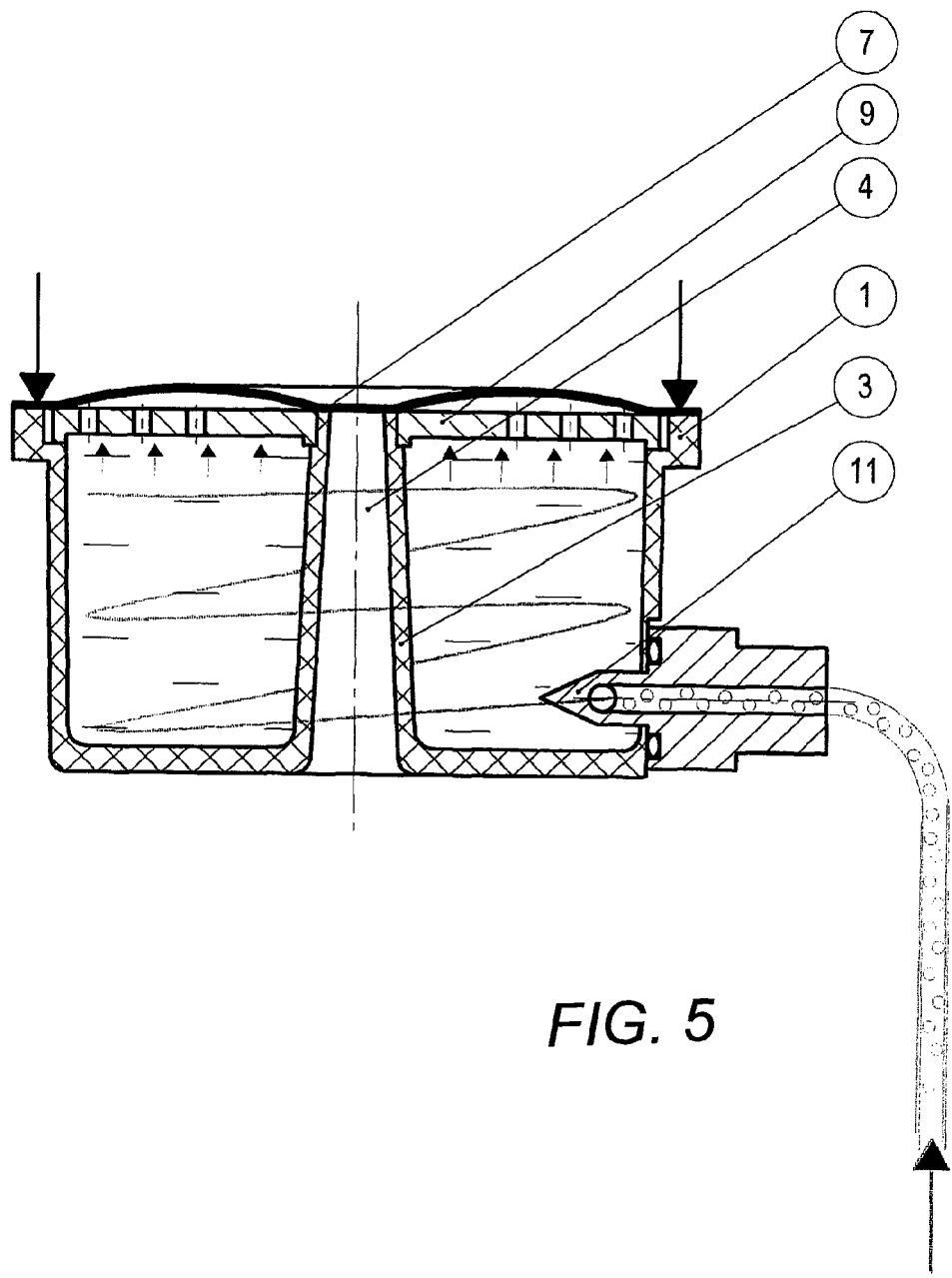
FIG. 5 schematically shows a vertical section view of the system shown in FIG. 4A once the injection means have started injecting water under pressure inside the capsule.

FIG. 5 highlights that water under pressure entered into the capsule 1 through the needle 11 has formed a vortex which has increased the pressure inside the capsule 1, lifting the sealing element 10 without detaching it and initiating the pre-infusion.

Figure 6:
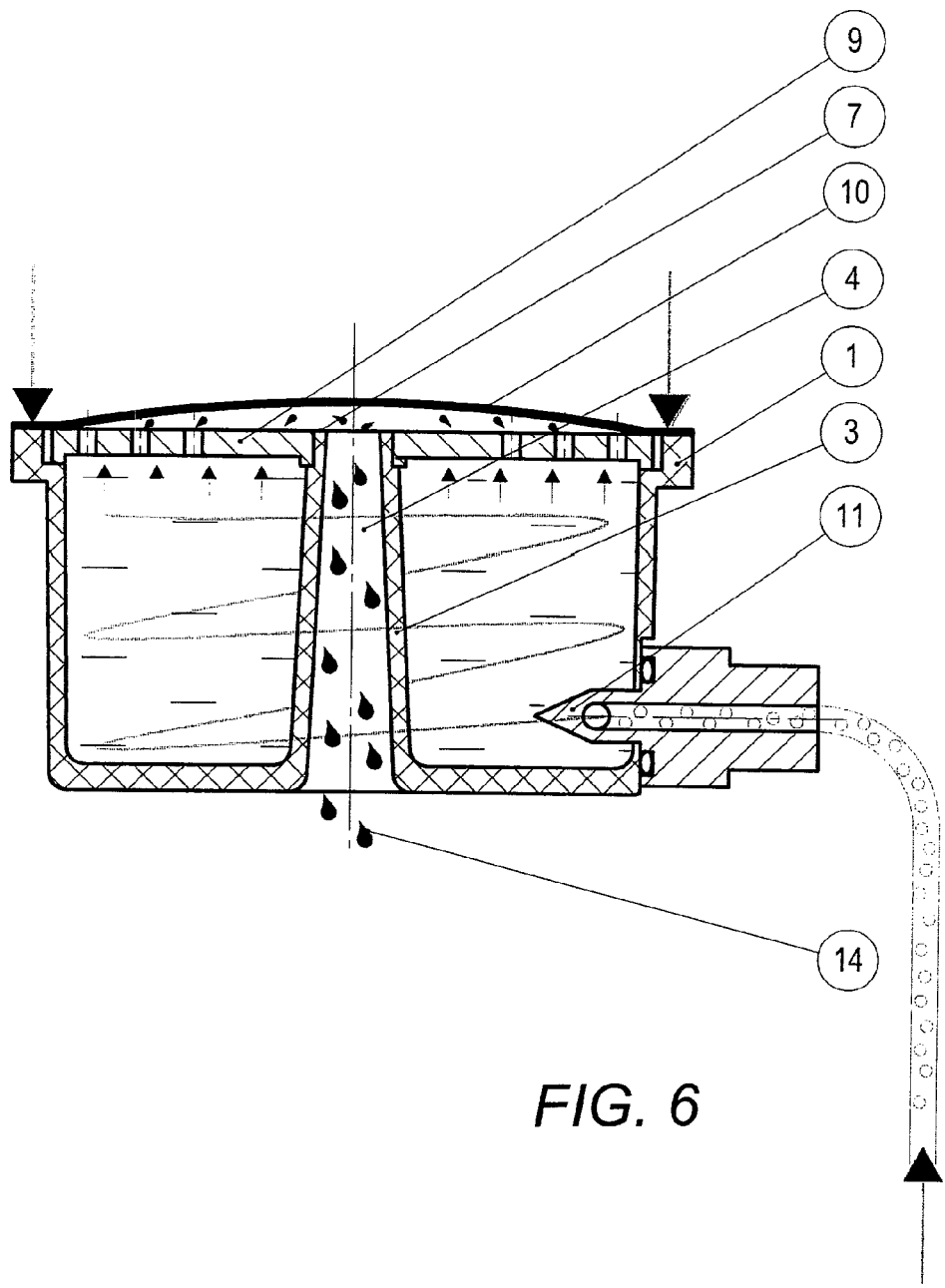
FIG. 6 schematically shows a vertical section view of the system shown in FIG. 4A during the dispensing of the beverage.

FIG. 6 shows that, as a consequence of the further increase of the internal pressure of the capsule 1, the sealing element 10 is detached from the top 7 of the internal out flow duct 3.

It is possible to see that, by means of the lifting of the sealing element 10, a way is opened for the infusion 14 toward the hole 4 of the duct 3, through which it flows outwards. The infusion is filtered by the filtering wheel 9 before reaching the hole 4 of the duct 3.

Figure 7:
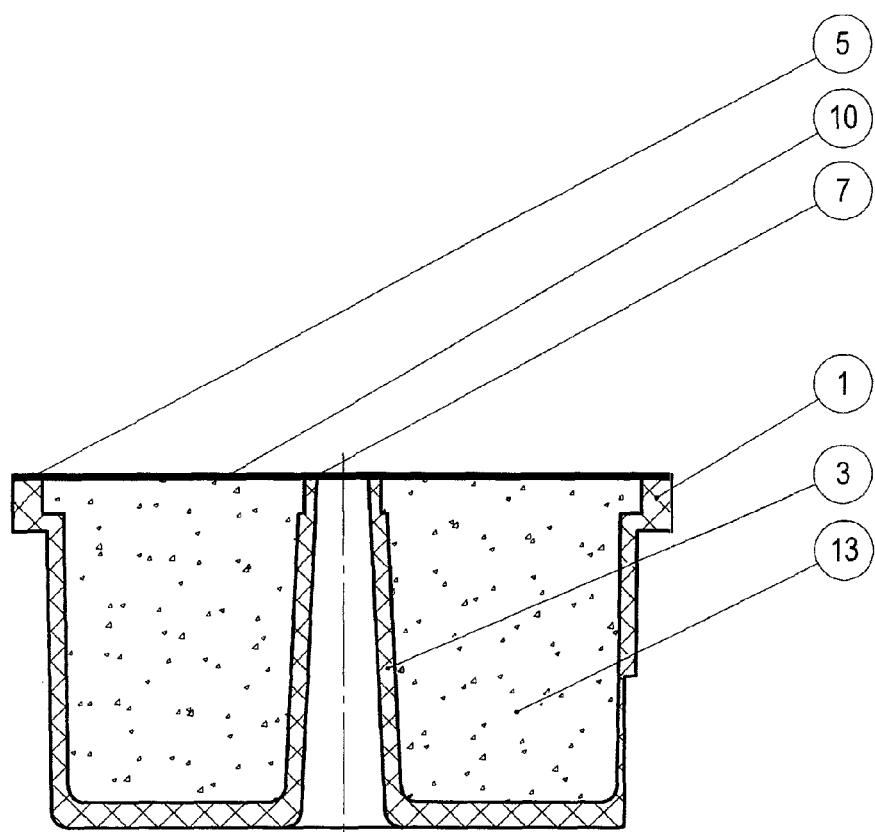
FIG. 7 schematically shows a vertical section view of a capsule according to a further embodiment of the present invention.

FIG. 7 shows an axial section of the capsule 1 according to a further embodiment of the present invention. The capsule is filled with a water-soluble product 13, for example powdered milk, cocoa, etc., and the sealing element 10 is welded to the upper surface 5 of the capsule and to the top of the internal out flow duct 3. In this case, the filtering wheel 9 is not present since the product is water-soluble.

Figure 8:
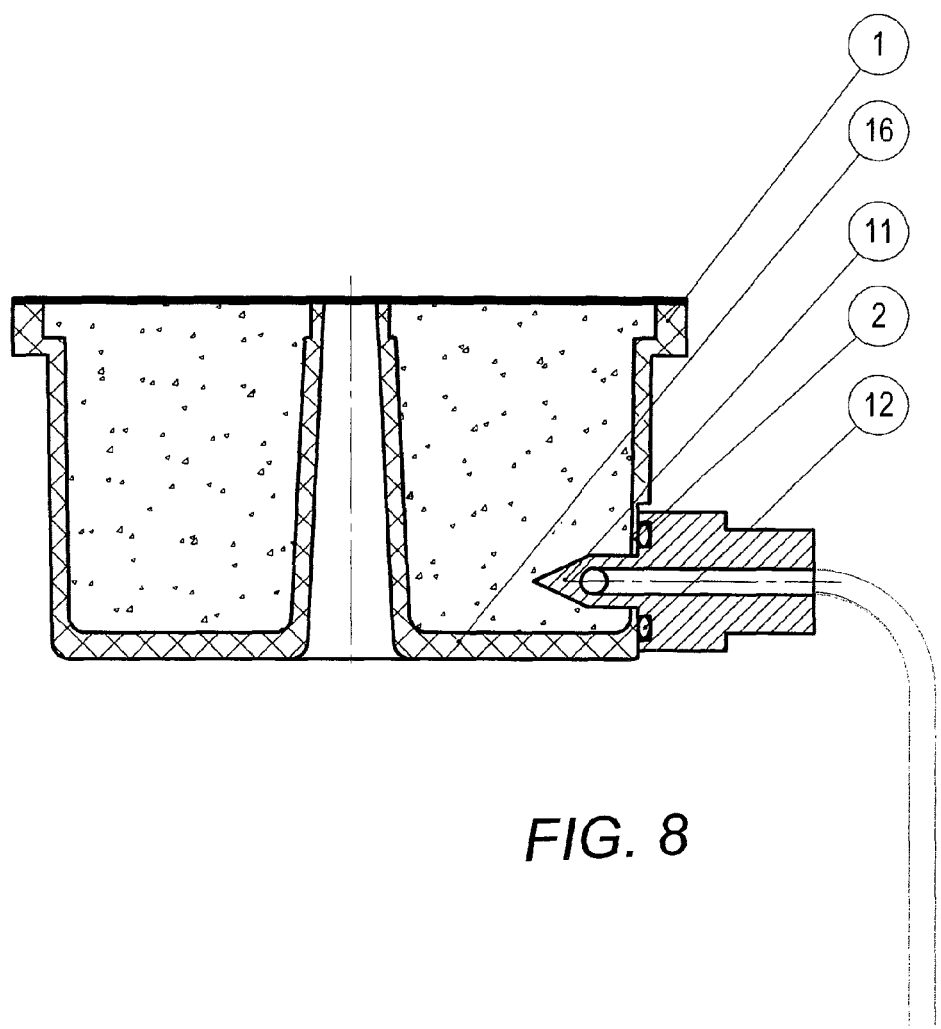
FIG. 8 schematically shows a vertical section view of the capsule shown in FIG. 7, inside which the injection means of the machine for using capsules according to an embodiment of the present invention are present.

FIG. 8 displays an axial section of the capsule 1 of FIG. 7 inside which injection means of the machine for using capsules according to an embodiment of the present invention are present. The injection means comprise a needle 11 which is penetrated laterally into the capsule in proximity to the bottom 16 through the flat surface 2, and a vertical plane 12 carrying the needle 11 and being hermetically sealed against the corresponding flat surface 2 of the side wall of the capsule.

Figure 9:
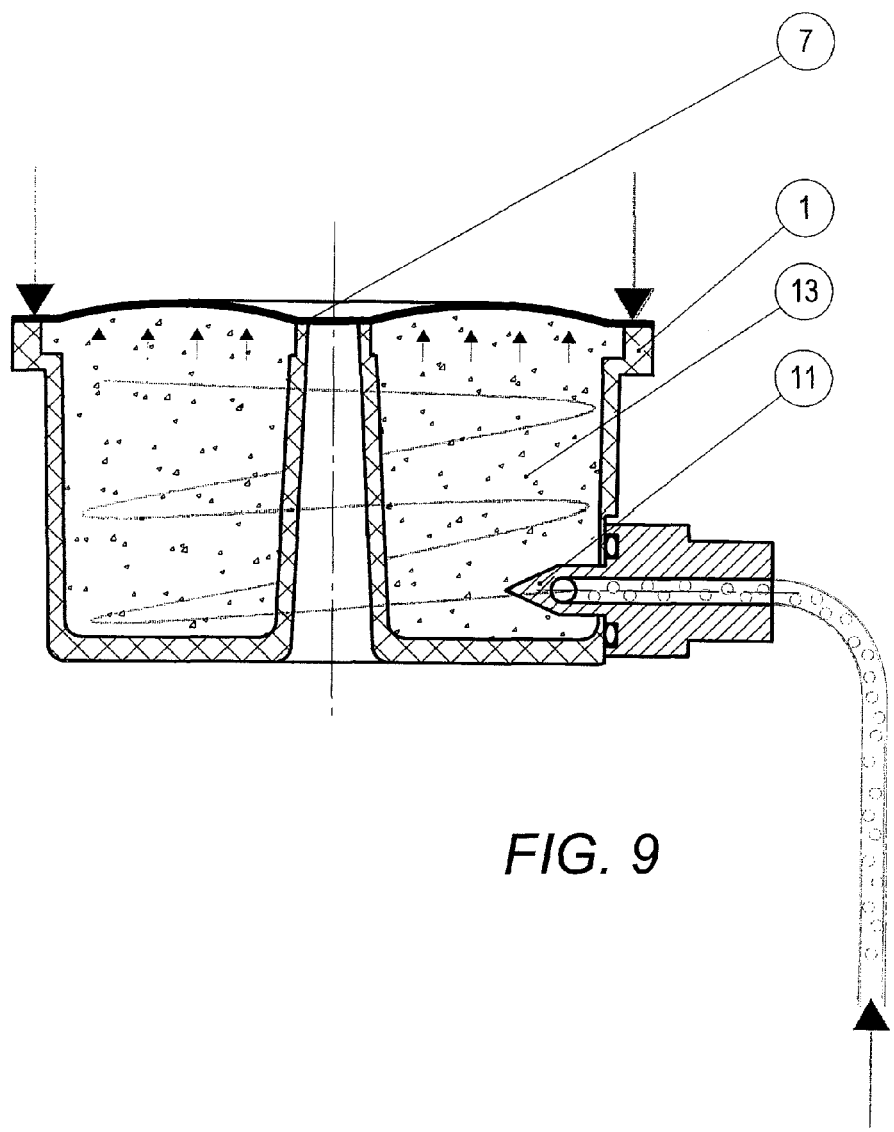
FIG. 9 schematically shows a vertical section view of the system shown in FIG. 8 once the injection means have started injecting water under pressure inside the capsule.

FIG. 9 highlights that water under pressure entered into the capsule 1 through the needle 11 has formed a vortex which has increased the pressure inside the capsule 1, lifting the sealing element 10 and initiating the water-solution process of the product 13.

Figure 10:
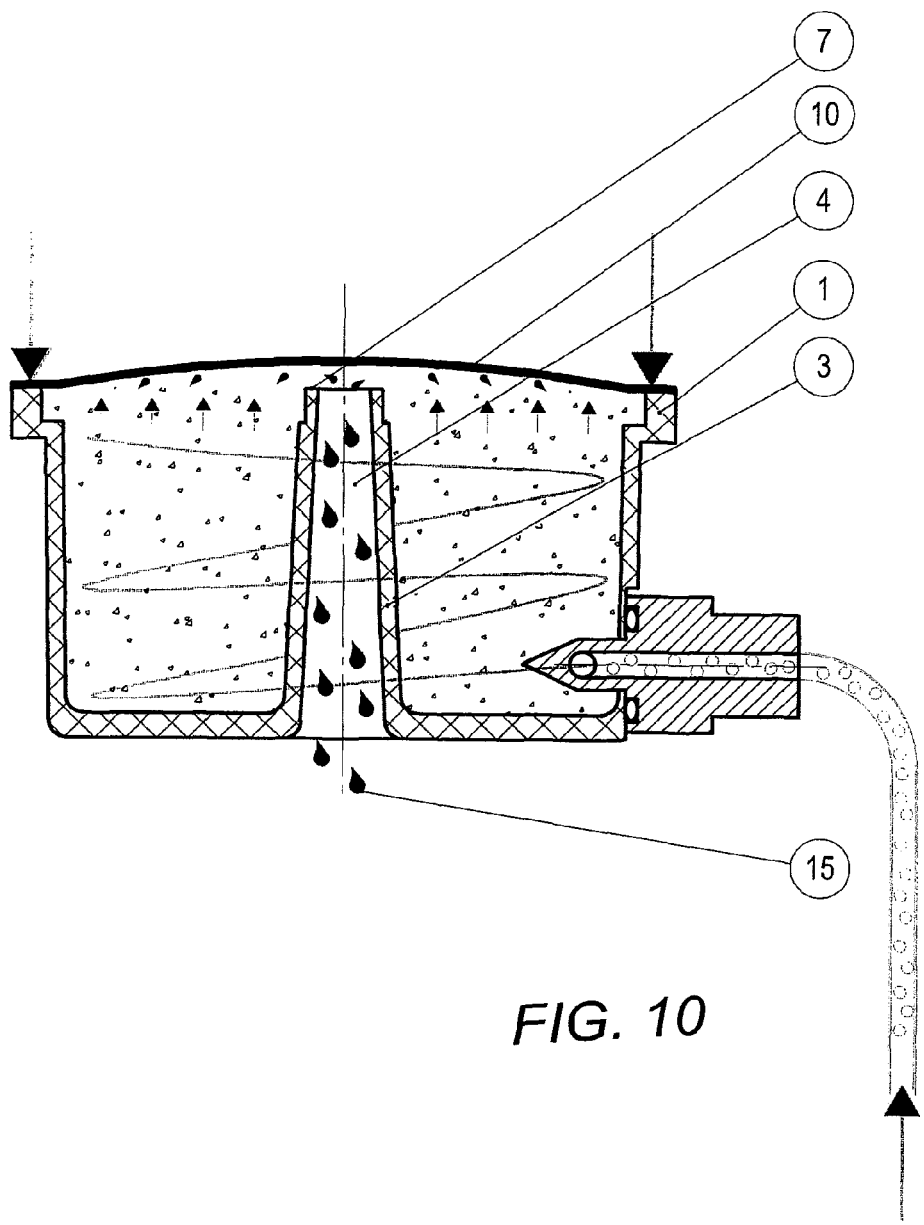
FIG. 10 schematically shows a vertical section view of the system shown in FIG. 8 during the dispensing of the beverage.

FIG. 10 shows that, as a consequence of the further increase of the internal pressure of the capsule 1, the sealing element 10 is detached from the top 7 of the internal out flow duct 3. By means of the lifting of the sealing element 10, a way is opened for the beverage 15 toward the hole 4 of the internal out flow duct 3, through which it flows outwards.

Figure 11:
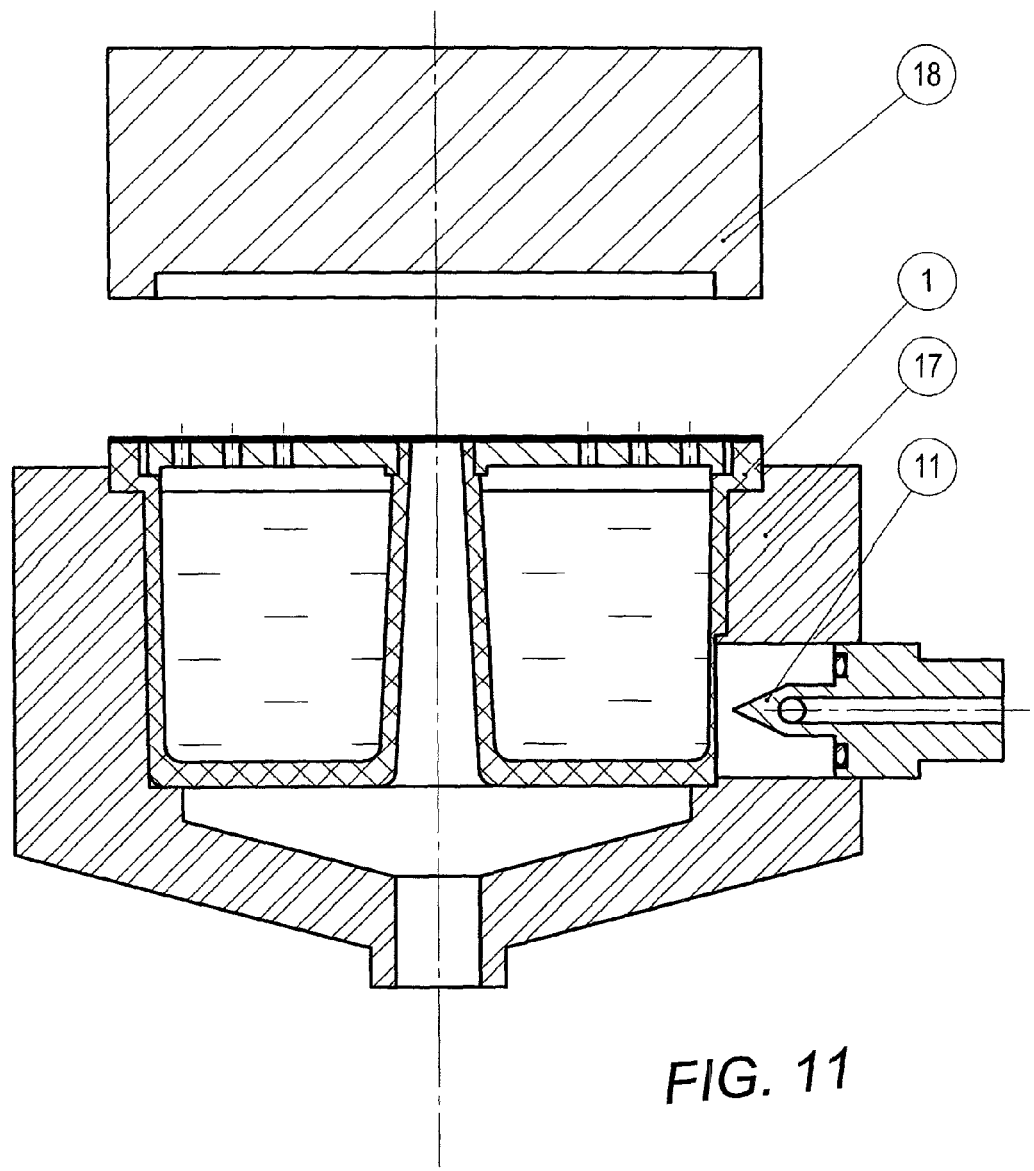
FIG. 11 schematically shows a vertical section view of a capsule according to an embodiment of the present invention housed inside a machine for using capsules according to an embodiment of the present invention.

FIG. 11 highlights in axial section that the capsule 1 is housed into a dispensing machine 17. The needle 11 of the dispensing machine is retracted and the cover 18 of the dispensing machine is lifted.

Figure 12:
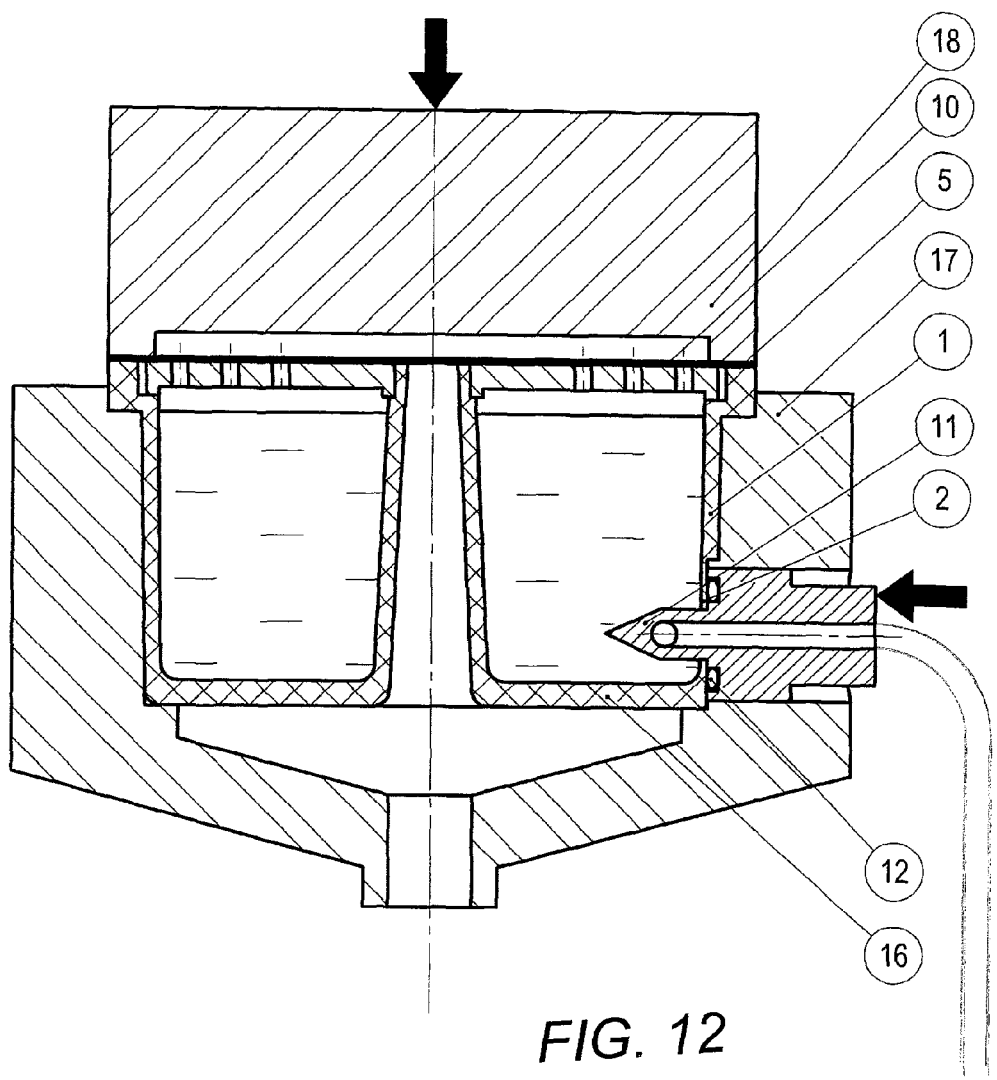
FIG. 12 schematically shows the system shown in FIG. 11 once the enclosing means of the machine have been closed.

FIG. 12 highlights in axial section that the cover 18 of the dispensing machine 17 is closed on the edge of the sealing element 10 of the capsule and above the upper surface 5 of the capsule 1. The needle 11 moved forward penetrating laterally into the capsule in proximity to the bottom 16. The vertical plane 12 forms a hermetic seal against the corresponding plane surface 2 of the capsule.

Figure 13:
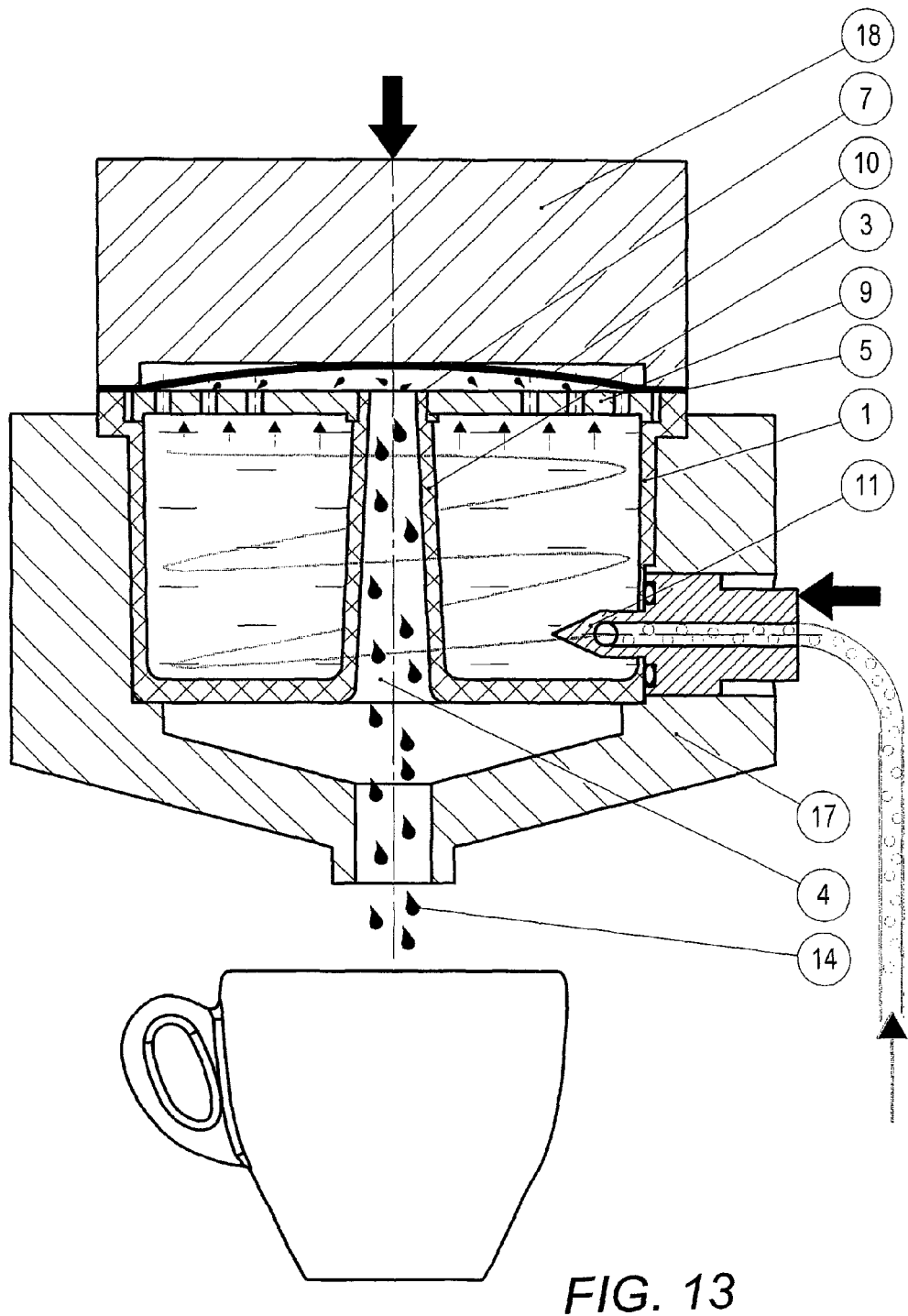
FIG. 13 schematically shows the system shown in FIG. 12 during the dispensing of the beverage in the case of an infusion product.

FIG. 13 highlights in axial section that the vortex of water under pressure entered into the capsule 1 through the needle 11, lifted the sealing element 10 of the capsule detaching it from the top 7 of the internal out flow duct 3, letting the infusion 14 flow out through the hole 4 toward the cup. The infusion 14 is filtered by the filtering wheel 9 before reaching the hole 4 of the internal out flow duct 3. The cover 18 is mechanically closed on the edge of the sealing element 10 and prevents it from detaching from the upper surface 5 of the capsule, even if it is subject to pressure. Furthermore, the cover 18 comprises a recess adapted to form enough free space so that the sealing element 10 detaches and lifts from the top 7 of the out flow duct 3 so as to open the internal through hole 4 and to allow the beverage to flow out of the capsule 1.

Figure 14:
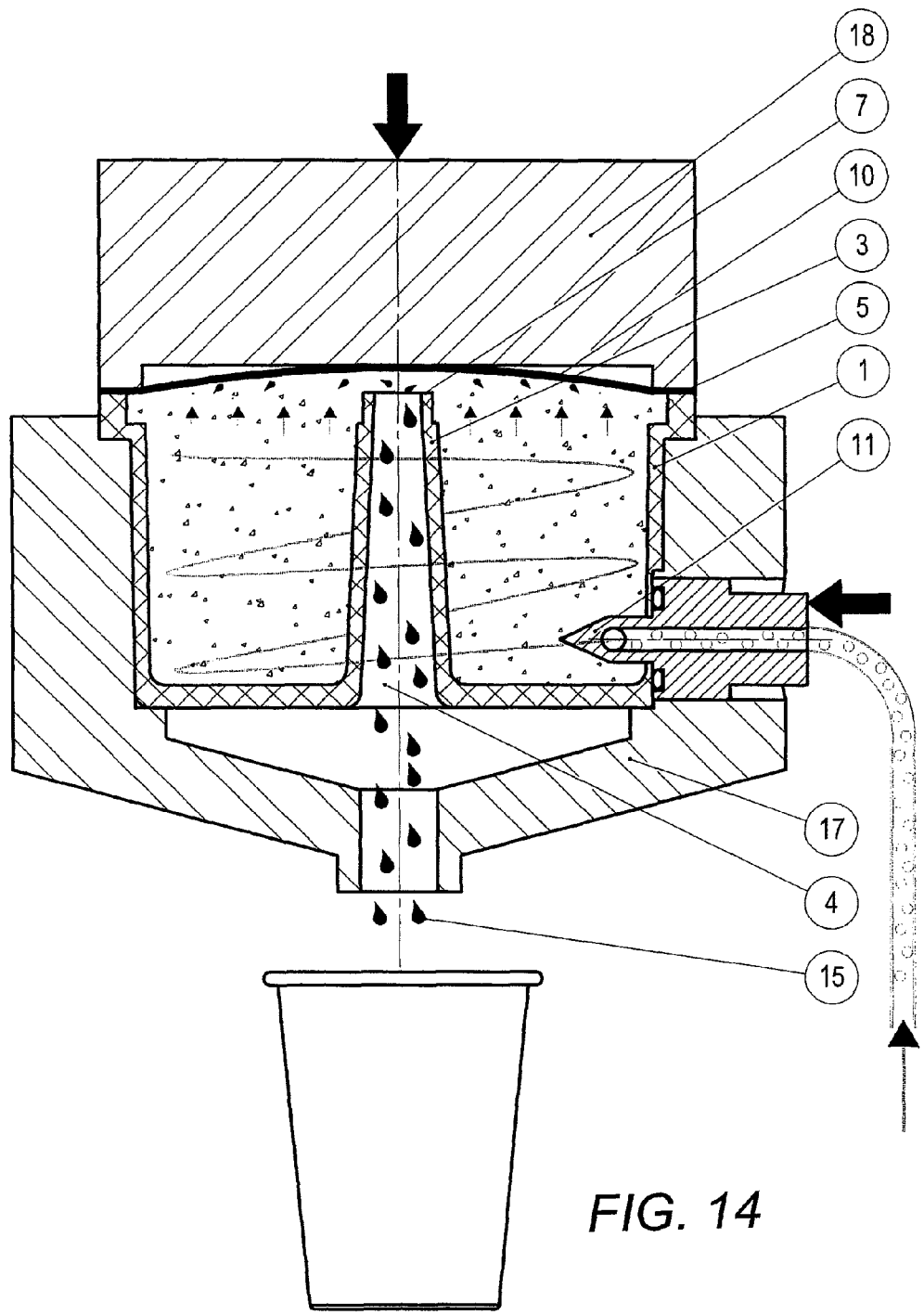
FIG. 14 schematically shows the system shown in FIG. 12 during the dispensing of the beverage in the case of a water-soluble product.

FIG. 14 highlights in axial section that the vortex of water under pressure entered into the capsule 1 through the needle 11 lifts the sealing element 10 of the capsule detaching it from the top 7 of the internal out flow duct 3, letting the beverage 15 flow through the hole 4 toward the glass. The cover 18 is mechanically closed on the edge of the sealing element 10, prevents it from detaching from the upper surface 5 of the capsule, even if it is subject to pressure. Furthermore, the cover 18 comprises a recess adapted to form enough free space so that the sealing element 10 detaches and lifts from the top 7 of the out flow duct 3 so as to open the internal through hole 4 and to allow the beverage to flow out of the capsule 1. Since the product is water-soluble, the filtering wheel 9 is not present.

Figure 15:
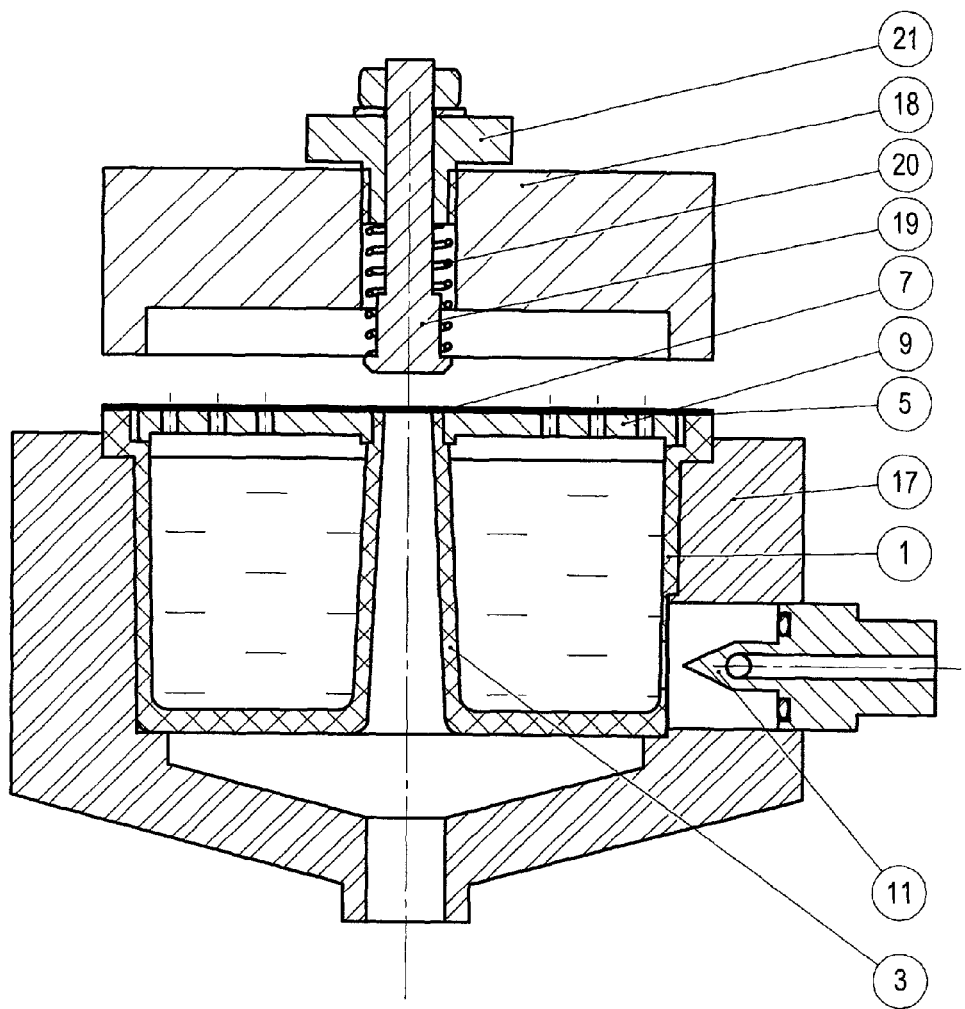
FIG. 15 schematically displays a vertical section view of a capsule according to an embodiment of the present invention, housed in a machine for using capsules comprising adjusting means for adjusting the pressure inside the capsule according to an embodiment of the present invention.

FIG. 15 highlights in axial section a further embodiment of the dispensing machine 17 according to the present invention.

The dispensing machine 17 further comprises adjusting means adapted to adjust the inner pressure of the capsule 1 when the capsule is housed in the machine during the dispensing phase.

In particular, in the example shown in FIG. 15, the cover 18 of the machine 17 is centrally provided with a sliding pin 19 coupled to a spring 20 whose pressure is adjustable by means of a threaded knob 21.

Figure 16:
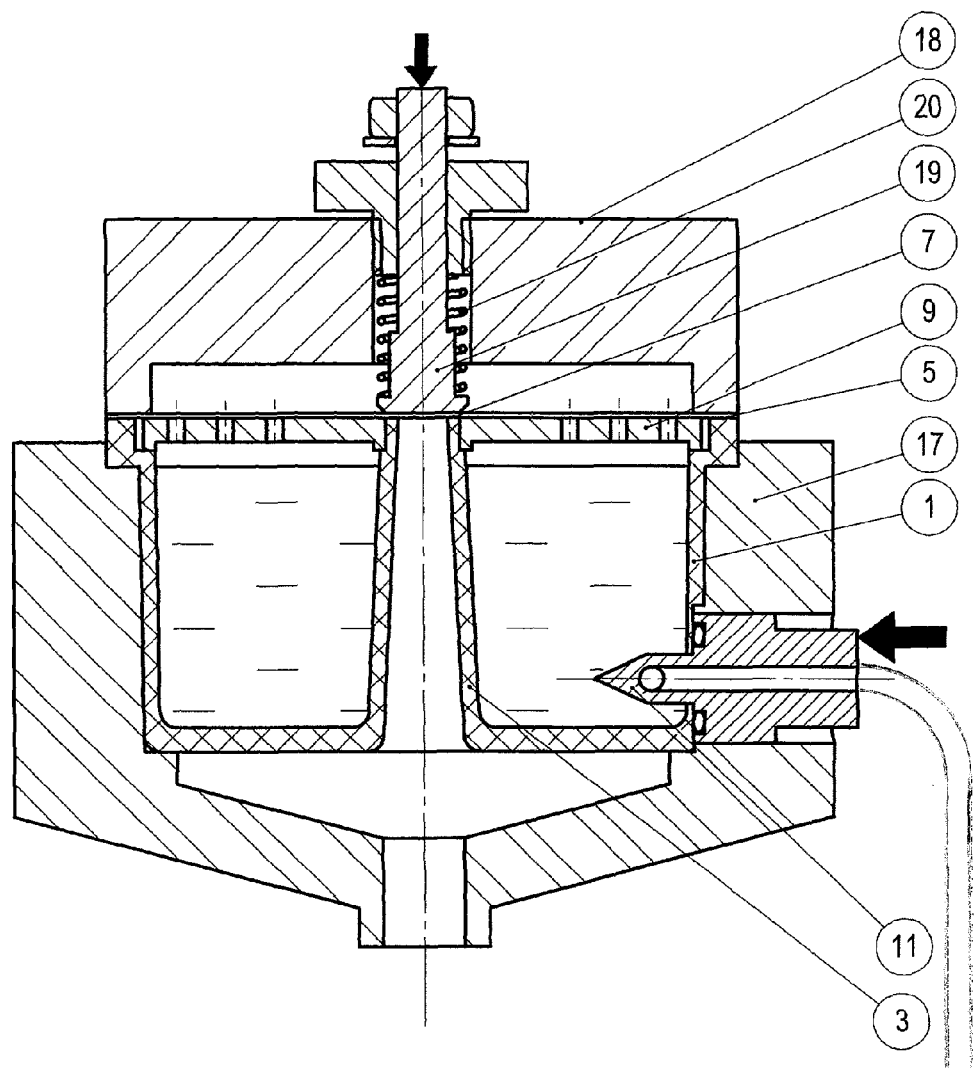
FIG. 16 schematically displays the system shown in FIG. 15 once the enclosing means of the machine have been closed.
Figure 17:
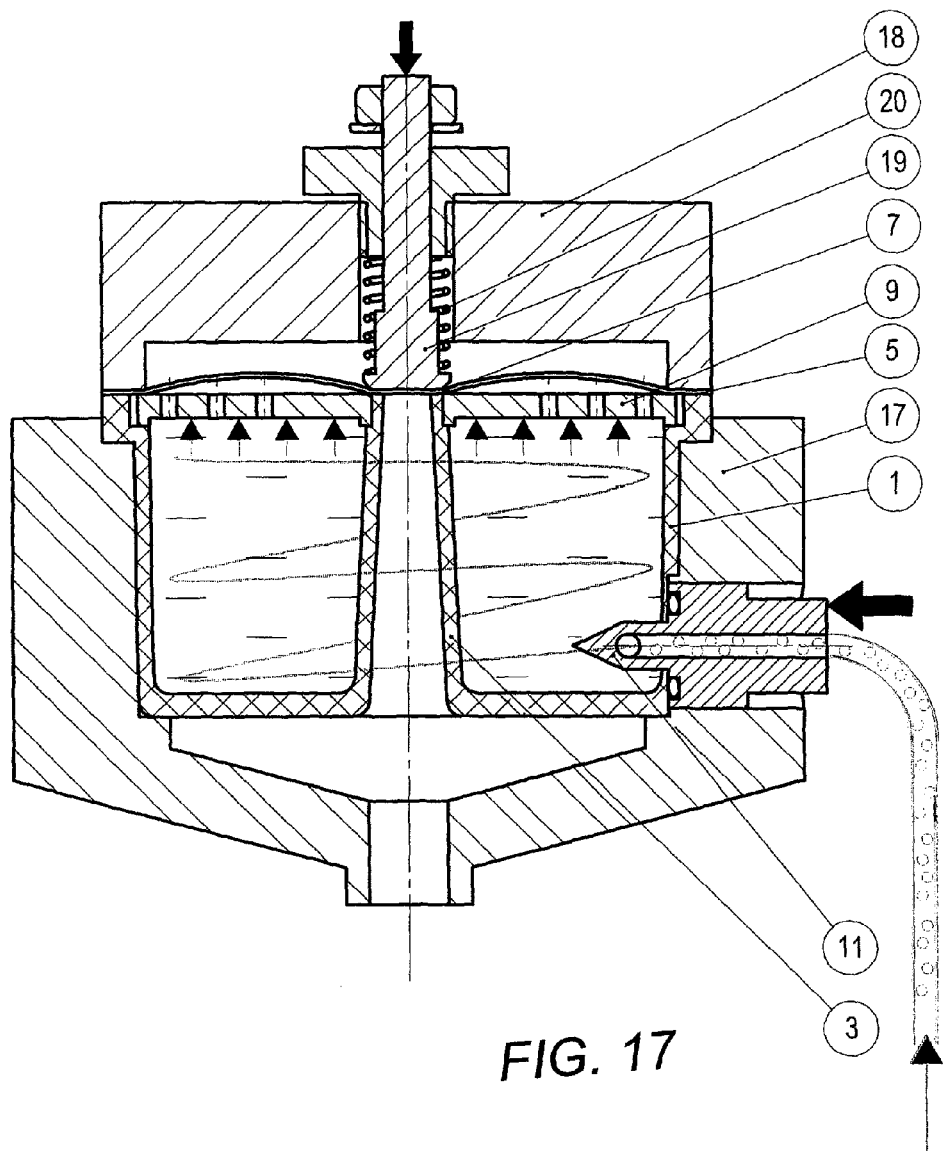
FIG. 17 schematically shows the system shown in FIG. 16 once the injection means have started injecting water under pressure inside the capsule.
Figure 18:
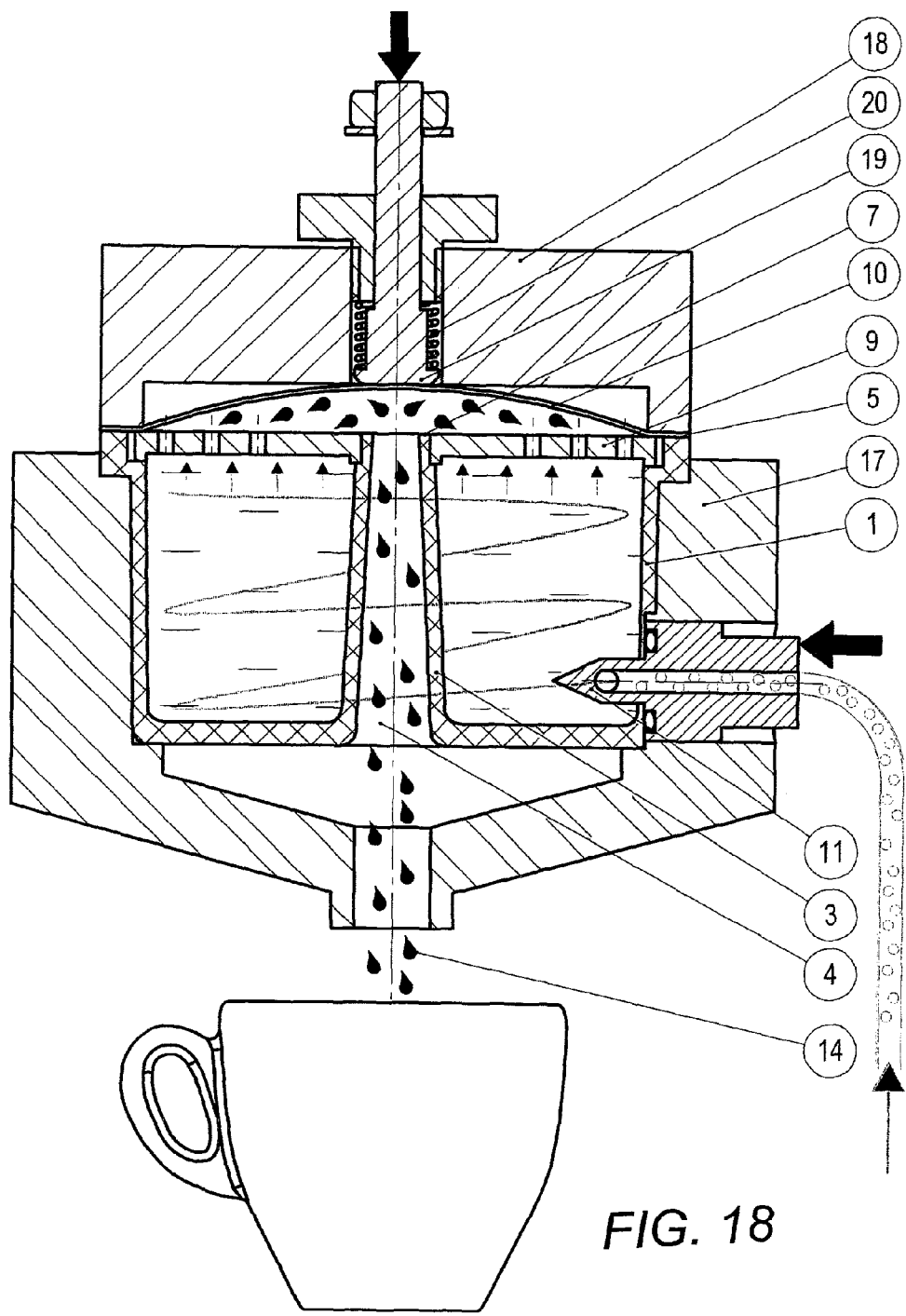
FIG. 18 schematically shows the system shown in FIG. 16 during the dispensing of the beverage.

FIGS. 16, 17 and 18 highlight in sequence that, varying the pressure on the sliding pin 19, the pressure inside the capsule necessary for detaching the sealing element 10 from the top 7 of the out flow duct 3 and for opening the way outwards of the infusion 14 also varies.

Figure 19:
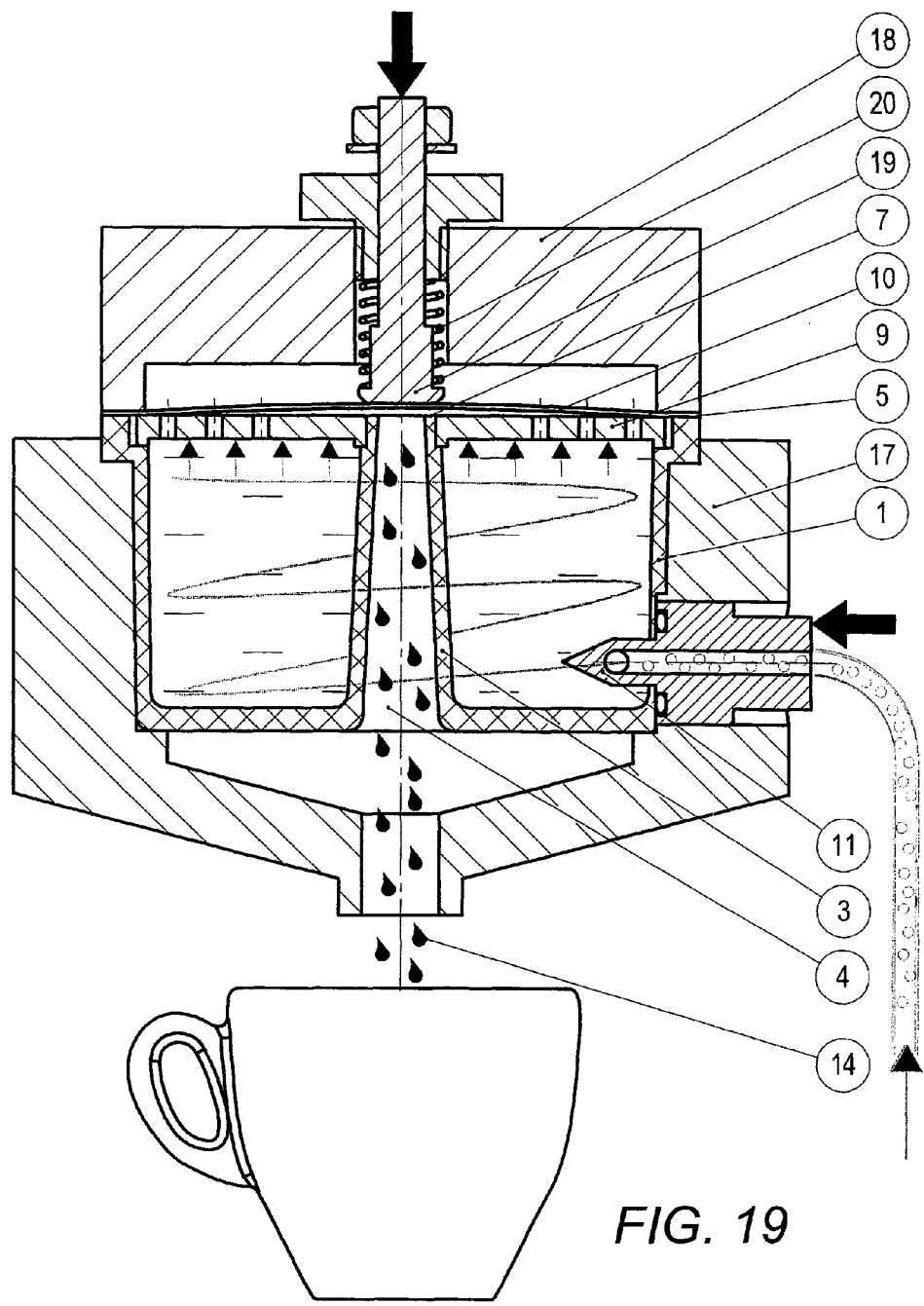
FIG. 19 schematically shows the system shown in FIG. 16 when the pressure applied by the adjusting means is in equilibrium with the inner pressure of the capsule.

FIG. 19 highlights in axial section that the pressure on the membrane 10 lifting it and due to the liquid contained in the capsule and the pressure of the adjusting means counteracting the internal pressure are in equilibrium.

Figure 20:
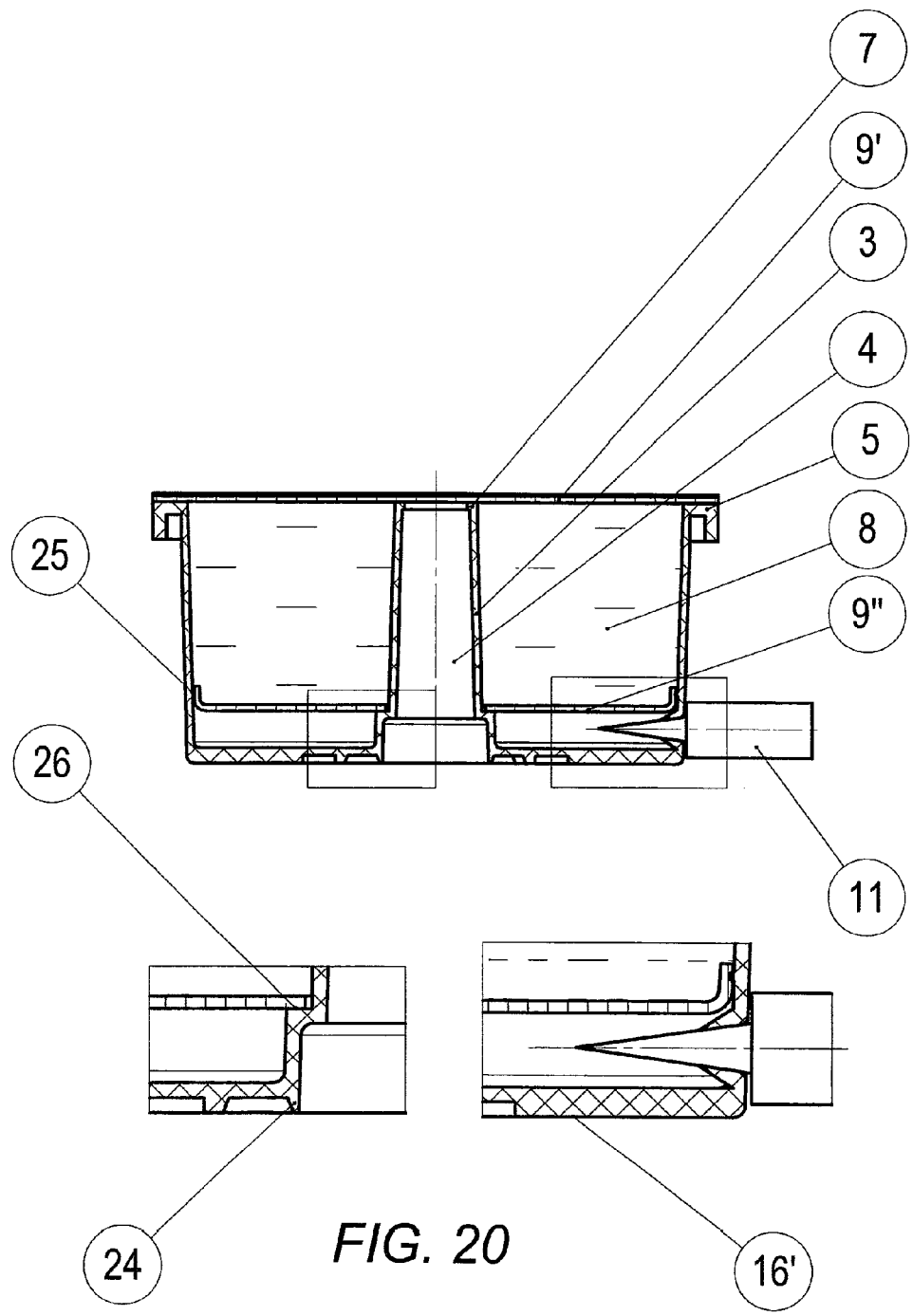
FIG. 20 schematically displays a vertical section view of a capsule according to a further embodiment of the present invention; the enlargements of the two portions marked in the figure are also shown.

FIG. 20 shows a capsule according to a further embodiment of the present invention. The capsule is filled with an infusion product 8.

The capsule comprises a lower filtering element 9" applied in proximity to the bottom 16 of the capsule 1 so as to form a room for the entry of water under pressure into the capsule. The infusion product is not present in this room. In particular, the infusion product 8 contained in the capsule is placed above the lower filtering element 9". As can be seen in FIG. 20, the injection means of the dispensing machine penetrate through the lateral sidewall of the capsule in proximity to the bottom of same so as to inject water under pressure into the room formed between the bottom of the capsule and the lower filtering element 9". In this way, the water occupies the entire useful surface of the capsule and, going up through the filtering element 9", hits the entire product contained in the capsule.

For example, if the product contained in the capsule is not homogeneously compact, the liquid under pressure could go up through preferential ways created in the areas where the product has lower compression, thus not hitting the entire product and obtaining a partial infusion, lowering the quality of the beverage. The room created by means of the lower filtering element 9" allows overcoming this problem.

Furthermore, since the injection means inject water in the room where the product is not present, the risk of blocking or ruining the injection means because of the solid components of the product is reduced. For example, in this way the needle of the injection means is protected from the penetration of coffee particles.

Since the lower filtering element 9" is filtering, it is not subject to the pressure of the liquid and is thus neither broken nor detached.

The lower filtering element 9" is particularly advantageous for infusion products.

The lower filtering element 9" may be made of permeable and filtering thermosealable material. Thermosealable material is easy to apply to the capsule. For example, the lower filtering element 9" may be made of thermosealable filter paper, which is particularly advantageous since it is inexpensive and can be obtained for example from a reel.

In the example shown in FIG. 20, the lower filtering element 9" is applied in an easy and efficient way in proximity to the bottom of the capsule in the following manner. The internal out flow duct 3 is provided with an enlarged terminal portion in proximity to the bottom 16 of the capsule so as to form a protrusion 26 inside the capsule. For example, in case the internal out flow duct 3 has a circular horizontal cross-section, the protrusion 26 forms a circular annular plane surrounding the surface of the internal out flow duct 3 facing the inside of the capsule. The lower filtering element 9" can be applied to the protrusion 26. In practice, the internal out flow duct 3 centres and supports the lower filtering element 9" by means of the protrusion 26. The lower filtering element 9" may be welded, for example thermowelded, to the protrusion 26.

Furthermore, the lower filtering element 9" may have a diameter which is larger than the diameter of the capsule so as to comprise an outer edge 25 which can be folded so as to adhere to a portion of the internal surface of the side wall of the capsule. The lower filtering element 9" may be thus welded, for example thermowelded, to the capsule by means of the edge 25.

The welds to the protrusion 26 and to the edge 25 give rigidity to the lower filtering element 9" and increase the stability of the capsule.

The capsule shown in FIG. 20 further comprises an upper filtering element 9' applied between the top 7 of the internal out flow duct 3 and the sealing element 10. In particular, the upper filtering element 9' is welded to the upper surface 5 of the capsule and to the top 7 of the internal out flow duct 3. The sealing element 10 is applied above the upper filtering element 9' and is thus welded to the upper surface 5 of the capsule and to the top 7 of the internal out flow duct through the upper filtering element 9'. The upper filtering element 9' is thus interposed between the product contained in the capsule and the sealing element 10 of the capsule. The upper filtering element 9' thus adheres to the sealing element 10. In particular, the upper surface of the upper filtering element 9' adheres to the lower surface of the sealing element 10. Furthermore, the capsule may be filled with a product, for example with an infusion product 8, in such a way that the upper surface of the product adheres to the lower surface of the lower filtering element 9'. The upper filtering element 9' may have the same shape and dimensions of the sealing element 10.

The liquid under pressure inside the capsule crosses the upper filtering element 9', pushes the sealing element 10 lifting it from the top 7 of the out flow duct 3 and, at this point, since it can pass through the space opened by the sealing element 10, crosses again the upper filtering element 9' before flowing out of the capsule through the internal through hole 4 of the out flow duct 3. In this way, the beverage is filtered twice before being dispensed.

Since the upper filtering element 9' is filtering, it is not subject to the pressure of the liquid and is thus neither broken nor detached.

The upper filtering element 9' is particularly advantageous for infusion products.

The upper filtering element 9' may be made of permeable and filtering thermosealable material. Thermosealable material is easy to apply to the capsule. For example, the upper filtering element 9' may be made of thermosealable filter paper, which is particularly advantageous since it is inexpensive and can be obtained for example from a reel.

FIG. 20 further shows that the internal out flow duct 3 comprises a terminal protruding portion 24 protruding with respect to the adjacent portion of the external surface 16' of the bottom 16 of the capsule so as to hinder the flow along the external surface 16' of the bottom of the capsule of the infusion or beverage flowing through the internal through hole. The terminal protruding portion 24 may comprise for example a circular annulus surrounding the exit hole of the out flow duct 3 on the bottom 16. In this way, it is possible to prevent that the liquid flowing out of the out flow duct 3 flows along the external surface 16' of the bottom of the capsule. Thanks to the terminal protruding portion 24, the liquid flowing out from the out flow duct 3 falls directly toward the container where it should be collected and is not wasted on the external surface 16' of the bottom of the capsule.

It is necessary to notice that even if the upper filtering element, the lower filtering element and the terminal protruding portion are shown in combination in the capsule displayed in FIG. 20, each of these features is independent from the others, so that it is possible that each of them is present individually or in any possible combination in the capsules according to the present invention.

Moreover, FIG. 20 schematically shows that the injection means 11 of the dispensing machine form a deformation toward the inside of the capsule in the sidewall of the capsule. In practice, the injection means do not simply form a hole in the side wall of the capsule so as to inject water into same, but they part and/or warp, toward the inside of the capsule, the surface of the sidewall of the capsule contiguous to the hole. This deformation improves the seal between the injection means and the entry hole of the injection means in the sidewall of the capsule. Thanks to the pressure of the water inside the capsule, the surface of the sidewall of the capsule in correspondence with the deformation pushes against the injection means enveloping them and improving the seal. These results may be easily obtained for example by providing the injection means with a needle having a conical shape as shown in FIG. 20.

The capsule shown in FIG. 20 is not provided with a surface 2 having a lower thickness than the thickness of the sidewall of the capsule.

Figure 21:
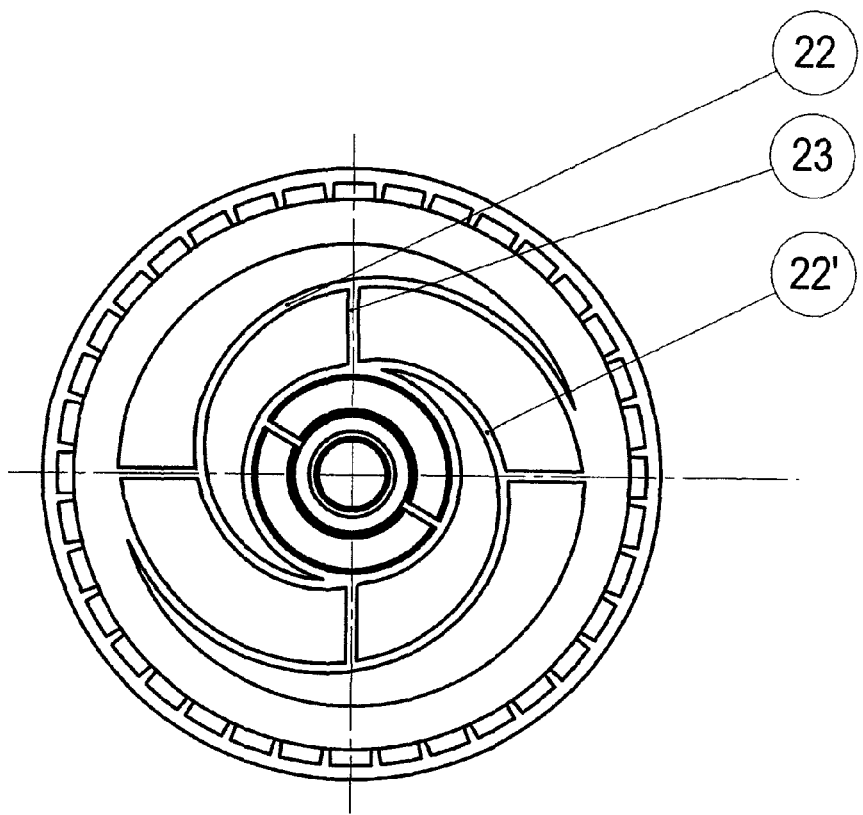
FIG. 21 schematically shows the outer surface of the bottom of a capsule according to a further embodiment of the present invention.

FIG. 21 schematically shows the outer surface of the bottom of a capsule according to a further embodiment of the present invention.

The bottom of the capsule comprises a strengthening structure adapted to keep the bottom substantially flat and to reinforce it.

In the example shown in FIG. 21, the strengthening structure comprises a pair of Archimedean spirals 22 and 22' concentric and intertwined. Furthermore, the spirals 22 and 22' are connected to each other in some points by means of ribs 23. The ribs 23 further strengthen the bottom of the capsule.

While the present invention has been described with reference to the embodiments described above, it is clear for the skilled person that it is possible to realize several modifications, variations and improvements of the present invention in the light of the teaching described above and within the ambit of the enclosed claims without departing from the spirit and the scope of protection of the invention.

For example, even if in the embodiments described above the capsule has substantially a cylindrical shape, the capsule can be made in several shapes.

In addition, those areas in which it is believed that those of ordinary skill in the art are familiar, have not been described herein in order not to unnecessarily obscure the invention described.

Accordingly, the invention is not to be limited by the specific illustrative embodiments, but only by the scope of the appended claims.

REFERENCE SIGNS

In the figures, each feature is indicated as follows:
1 is the capsule obtained by injection of thermoplastic material or by thermoforming;
2 is the flat surface on the outer sidewall of the capsule;
3 is the internal out flow duct of the capsule;
3' is the terminal cylindrical portion of the internal out flow duct;
4 is the through hole of the internal out flow duct;
4' are the small filtering holes at the top of the internal out flow duct;
5 is the upper surface of the capsule;
6 is the groove in the upper surface of the capsule which can be employed for example for housing the filtering wheel;
7 is the top of the internal out flow duct;
8 is the infusion product contained in the capsule;
9 is the filtering wheel;
9' is the upper filtering element;
9" is the lower filtering element;
10 is the sealing element of the capsule, for example a peeling barrier film sealing membrane, hermetically sealed to the top of the internal out flow duct and to the upper surface of the capsule;
11 are the injection means for injecting water under pressure into the capsule, for example a needle, with a bent bore, punching the sidewall of the capsule and injecting water under pressure;
11' is the bent bore inside the needle;
12 is the vertical plane carrying the needle and adapted to seal it into the capsule during the infusion;
13 is the water-soluble product contained in the capsule;
14 is the infusion obtained;
15 is the beverage obtained;
16 is the bottom of the capsule;
16' is the outer surface of the bottom of the capsule;
17 is the dispensing machine;
18 is the cover of the dispensing machine;
19 is the sliding pin of the dispensing machine;
20 is the adjustable spring of the dispensing machine;
21 is the threaded knob for adjusting the resilience of the spring;
22 and 22' are the two Archimedean spirals, concentric and intertwined, placed on the outer surface of the bottom of the capsule;
23 are the ribs connecting to each other the two Archimedean spirals 21 and 22;
24 is the terminal protruding portion of the internal out flow duct, protruding with respect to the adjacent portion of the outer surface of the bottom of the capsule;
25 is the outer edge of the lower filtering element 9";
26 is the protrusion formed inside the capsule by the enlarged terminal portion of the internal out flow duct 3.

The invention claimed is:

1. Capsule injection moulded or thermoformed for obtaining a beverage from products placed therein, the capsule comprising an internal outflow duct comprising an internal through hole for an outflow of the infusion beverage through the internal through hole from the capsule and a differentially attached sealing element, the capsule comprising an upper surface having a closed perimeter for supporting said differentially attached sealing element so as to hermetically seal the capsule by means of said differentially attached sealing element,
   wherein a top of said internal outflow duct is substantially on the same level as said upper surface of the capsule and placed within the closed perimeter of the upper surface of the capsule so that said top supports said differentially attached sealing element when the capsule is sealed so as to seal said internal through hole and said differentially attached sealing element is welded to said upper surface of the capsule and said top of said internal outflow duct with differential detachment welding,
   wherein said differential detachment welding allows for lifting of said differential attached sealing element from said top of the internal outflow duct opening the internal through hole and at the same time keeping said differentially attached sealing element fixed to the closed perimeter of the upper surface of the capsule,
   whereby by injecting water under pressure into the capsule, said differentially attached sealing element is lifted becoming detached from the top of the internal outflow duct, opening said internal through hole of said internal outflow duct so that the beverage flows outwards through said internal through hole and said differentially attached sealing element remains welded to the closed perimeter of said upper surface.

2. Capsule according to claim 1, wherein said differentially attached sealing element comprises a peelable barrier film sealing membrane.

3. Capsule according to claim 1, wherein said internal outflow duct is substantially perpendicular to a bottom of the capsule.

4. Capsule according to claim 1, wherein said top of said internal outflow duct is flat.

5. Capsule according to claim 1, wherein the internal outflow duct has substantially a conical shape.

6. Capsule according to claim 1, wherein the internal outflow duct ends with a cylindrical portion.

7. Capsule according to claim 1, wherein the internal outflow duct comprises a terminal protruding portion protruding with respect to an adjacent portion of an external surface of a bottom of the capsule so as to hinder a flow along the external surface of the bottom of the capsule of the beverage flowing through said internal through hole.

8. Capsule according to claim 1, further comprising a lower filtering element applied in proximity to a bottom of the capsule so as to form a room for entry of water under pressure into the capsule.

9. Capsule according to claim 8, wherein said lower filtering element has a larger unfolded diameter than an inner diameter of the capsule so as to comprise an outer edge which is folded so as to adhere to a portion of an inner surface of the sidewall of the capsule.

10. Capsule according to claim 1, further comprising an upper filtering element applied between said top of said internal outflow duct and said differentially attached sealing element so that the beverage flows through said upper filtering element before lifting said differentially attached sealing element, and the beverage flows through said upper filtering element again before flowing out through said internal through hole.

11. Capsule according to claim 10, wherein said upper filtering element is welded to the upper surface of the capsule and to the top of the internal outflow duct and said differentially attached sealing element is welded to the upper surface of the capsule and to the top of the internal outflow duct so that a lower surface of said differentially attached sealing element adheres to an upper surface of said upper filtering element.

12. Capsule according to claim 10, wherein at least one or both of said lower filtering element and said upper filtering element comprises permeable and filtering thermosealable material.

13. Capsule according to claim 1, wherein the internal outflow duct comprises a terminal portion in proximity to a bottom of the capsule so as to form a protrusion inside the capsule.

14. Capsule according to claim 1, wherein, a filtering wheel having a hole with the top of the internal outflow duct placed within the hole and sitting on a circular groove of the capsule.

15. Capsule according to claim 1, wherein said internal through hole comprises a plurality of filtering holes in proximity to said top of said internal outflow duct.

16. Capsule according to claim 1, further comprising a flat surface, having a lower thickness than a thickness of a sidewall of the capsule, said flat surface formed on a portion of the sidewall of the capsule.

17. Capsule according to claim 1, wherein a bottom of the capsule comprises a strengthening structure for keeping said bottom substantially flat.

18. A capsule assembly for creating a beverage from a product placed within the capsule assembly when a fluid is injected into the capsule assembly under pressure comprising:
   a capsule having an open top with an upper surface and a bottom, said upper surface forming a perimeter;
   an internal outflow duct placed within the perimeter extending from the bottom to the open top of said capsule, said internal outflow duct having a flat top and a through hole;
   a product placed within said capsule; and
   a differentially attached sealing element, said differentially attached sealing element unreleasably fixed to the perimeter of the upper surface of said capsule and releasably attached to the flat top of said internal outflow duct covering and hermetically sealing the open top of said capsule,
   whereby said differentially attached sealing element is lifted from the flat top of said internal outflow duct so as to open the through hole when the fluid is injected into the capsule assembly under a predetermined pressure limited so that said differentially attached sealing element lifts off the flat top of said internal outflow duct yet remains fixed to the upper surface of said capsule.

19. A capsule assembly as in claim 18 further comprising:
   a filter placed between the open top and said differentially attached sealing element.

20. A capsule assembly as in claim 18 further comprising:
   a flat surface, placed in said capsule, having a reduced thickness relative to a thickness of said capsule,
   whereby said flat surface is adapted to receive an injection means for injecting the fluid into said capsule.

* * * * *